United States Patent
Tanaka

(10) Patent No.: US 6,965,378 B2
(45) Date of Patent: Nov. 15, 2005

(54) COORDINATE INPUT APPARATUS, COORDINATE INPUTTING METHOD, INFORMATION DISPLAY SYSTEM AND STORAGE MEDIUM AND PROGRAM

(75) Inventor: Atsushi Tanaka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1081 days.

(21) Appl. No.: 09/824,748

(22) Filed: Apr. 4, 2001

(65) Prior Publication Data

US 2001/0050670 A1    Dec. 13, 2001

(30) Foreign Application Priority Data

Apr. 7, 2000 (JP) .............................. 2000-106904

(51) Int. Cl.$^7$ ............................................. G09G 5/00
(52) U.S. Cl. ...................................... 345/179; 345/156
(58) Field of Search ............................... 345/156–166, 345/175, 179–180, 183, 158, 169; 178/18.01, 178/18.03, 18.09, 18.06, 18.7, 19.01–19.05, 178/19.07

(56) References Cited

U.S. PATENT DOCUMENTS

| | | | |
|---|---|---|---|
| 4,897,510 A | 1/1990 | Tanaka et al. ................ 178/18 |
| 4,931,965 A | 6/1990 | Kaneko et al. ............... 33/1 P |
| 5,017,913 A | 5/1991 | Kaneko et al. ............. 340/706 |
| 5,097,102 A | 3/1992 | Yoshimura et al. ........... 178/18 |
| 5,142,106 A | 8/1992 | Yoshimura et al. ........... 178/18 |
| 5,239,138 A | 8/1993 | Kobayashi et al. ........... 178/18 |
| 5,500,492 A | 3/1996 | Kobayashi et al. ........... 178/18 |
| 5,515,079 A * | 5/1996 | Hauck ........................ 345/157 |
| 5,565,893 A | 10/1996 | Sato et al. .................. 345/177 |
| 5,627,565 A * | 5/1997 | Morishita et al. ........... 345/158 |
| 5,736,979 A | 4/1998 | Kobayashi et al. ......... 345/173 |
| 5,805,147 A | 9/1998 | Tokioka et al. ............... 178/18 |
| 5,818,429 A | 10/1998 | Tanaka et al. .............. 345/173 |
| 5,831,603 A | 11/1998 | Yoshimura et al. ......... 345/174 |
| 5,933,149 A | 8/1999 | Mori et al. .................. 345/358 |
| 5,936,207 A | 8/1999 | Kobayashi et al. ......... 345/175 |
| 6,339,748 B1 * | 1/2002 | Hiramatsu .................. 702/159 |

* cited by examiner

*Primary Examiner*—Bipin Shalwala
*Assistant Examiner*—Mansour M. Said
(74) *Attorney, Agent, or Firm*—Fitzpatrick, Cella, Harper & Scinto

(57) ABSTRACT

To provide a coordinate input apparatus with higher resolution and excellent agility in terms of usage, without causing reduction in the detection speed of input light. At the time of calculating coordinate data of a predetermined ordinal number, a readout portion of a CCD is determined from coordinate data whose ordinal number precedes the predetermined ordinal number, and an output is obtained partially from the determined readout portion, and the coordinate data of the predetermined ordinal number is calculated to generate a coordinate output signal corresponding to a predetermined position of a screen.

2 Claims, 22 Drawing Sheets

COORDINATE INPUT APPARATUS, COORDINATE INPUTTING METHOD, INFORMATION DISPLAY SYSTEM AND STORAGE MEDIUM AND PROGRAM

BACKGROUND OF THE INVENTION

1. Field of the Invention

The present invention relates to a coordinate input apparatus, a coordinate inputting method, an information display system and a storage medium used for a large information display system. More particularly, it mainly relates to a coordinate input apparatus that is used for controlling a computer externally connected and writing characters and graphics by inputting coordinates directly in the screen of a large display with a designation device.

2. Related Background Art

In recent years, large-screen displays are being not only improved in brightness but also increased in scale of screens and resolution. For coordinate input apparatuses that are used in these devices, pen-shaped types are used, and cordless types are used because of large input areas, and for this type of devices, devices that use ring-shaped Change Coupled Device (CCD) as an optical/electrical conversion element (hereinafter referred to as a ring CCD), have high resistance to external random lights, and are compact and inexpensive are proposed, as described in Japanese Patent Application Laid-open No. 10-019506.

These coordinate input apparatuses using the ring CCD blink input lights and use a differential between the input lights during lit conditions and the input lights during unlit conditions to detect the input lights. For this reason, they are adapted for detecting timings during lit conditions and during unlit conditions and performing cordless input. In recent years, the number of pixels of the CCD has been increased, and coordinate input apparatuses with the larger numbers of bits have been devised. The resolution is improved as the number of bits is increased, but time required for reading data is prolonged accordingly.

Also, for the number of pixels needed to calculate a coordinate, the whole width of CCD pixels are not required and only the data of inputted portions are necessary, thus causing a loss of time during read of unnecessary pixel data. Furthermore, if long time is required for detection of input lights, the speed of input is affected, resulting in loss of agility in terms of usage.

SUMMARY OF THE INVENTION

Thus, the present invention has been made considering the above described problems, and its object is to provide a coordinate input apparatus and a coordinate inputting method with higher resolution and better agility in terms of usage without causing reduction in the speed of detecting input light and an information display system provided with the same.

A coordinate input apparatus according to the present invention is an apparatus calculating a coordinate corresponding to a position of a light spot with which an input screen is irradiated, including: a sensor array configured in such a manner that a plurality of optical/electrical conversion elements is arranged; coordinate computing means for successively calculating coordinate data of the above described light spot from the output of the above described sensor array; and determining means for determining a readout portion of the above described sensor array from the above described coordinate data whose ordinal number precedes a predetermined ordinal number, at the time of calculating the above described coordinate data of the predetermined ordinal number, in which the above described coordinate computing means calculates the above described predetermined coordinate data of the above described ordinal number, based on the output from the above described readout portion determined by the above described determining means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 17-1 and 17-2 are flowcharts showing coordinate computation processing;

DETAILED DESCRIPTION OF THE PREFERRED EMBODIMENTS

Preferred embodiments of the present invention will now be described in detail in accordance with the accompanying drawings.

(First Embodiment)

Device Configuration

Figure 2:
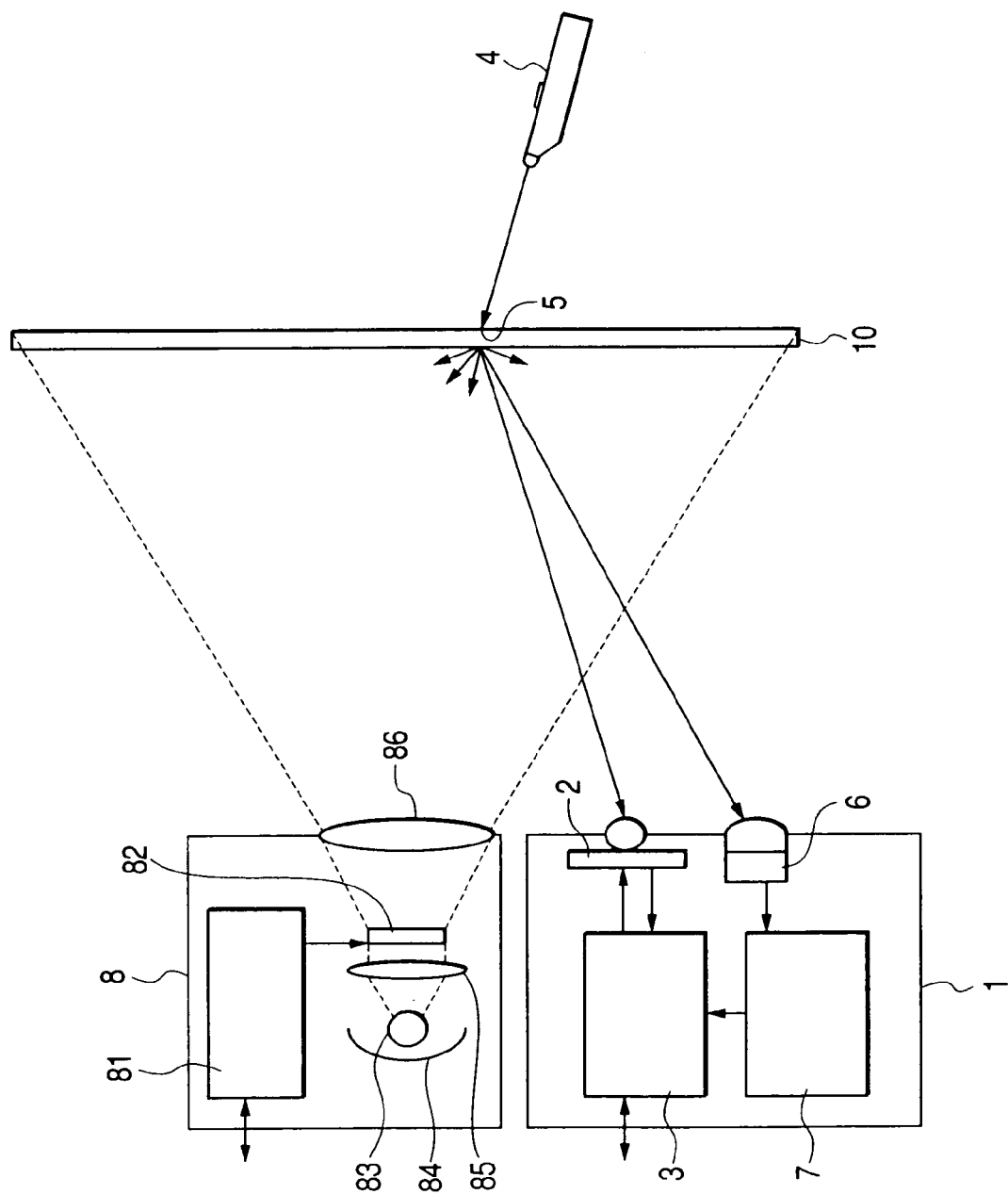
FIG. 2 is a schematic diagram showing a general configuration of a coordinate input apparatus.

FIG. 2 is a schematic diagram showing an outlined configuration of an optical coordinate input apparatus relating to the present invention.

The optical coordinate input apparatus comprises a designation device 4 that forms a light spot for a screen 10 being a coordinate input surface, and a coordinate detector 1 that detects position coordinates and the like on the screen 10 of the light spot 5. A projection-type display 8 that displays images or position information on the screen 10 as an output device is described in FIG. 2 together with the apparatus. An information display system is comprised of these coordinate input apparatuses and the projection-type display 8.

Figure 3:
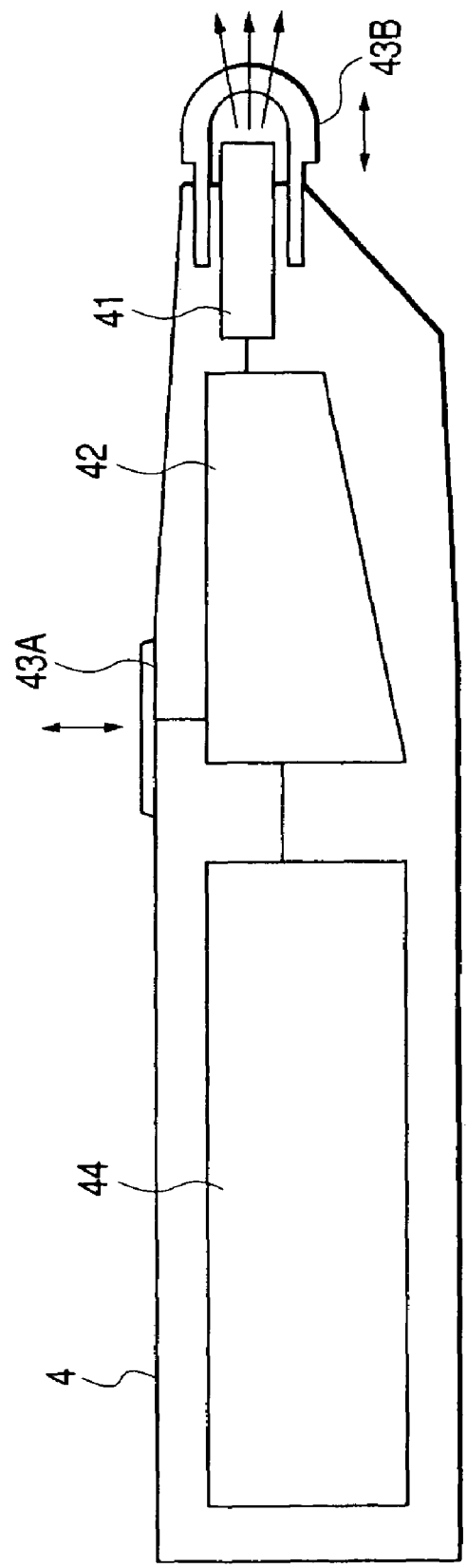
FIG. 3 is a schematic diagram showing an outlined configuration of a designation device.

The designation device 4 includes therein a light emitting element 41 such as a semiconductor laser or LED emitting optical beams, light emission control means 42 for performing drive control of the light emission, a plurality of operative switch means 43 and power means 44 such as a battery (See FIG. 3). According to states of the operative switch 43, the light emission control means 42 performs light emission control with control signals being superimposed, by means of ON/OFF of light emission and modulation described later.

The coordinate detector 1 is comprised of a coordinate detection sensor unit 2, a controller 3 performing control of this sensor unit, coordinate computation and the like, a control signal detection sensor 6 and a signal processor unit 7, and is adapted for detecting the position of the coordinate on the screen 10 of the light spot 5, and the control signal corresponding to the state of each switch of the designation device 4 described later, and communicating information thereof to an external connecting device (not shown) using the controller 3.

The projection-type display 8 comprises an image signal processing unit 81 in which the image signal from a display signal source being the external connecting device (not shown) such as a computer is inputted, an illuminating optical system constituted by a liquid panel 82, a lamp 83, a mirror 84 and a condenser lens 85 that are controlled by the image signal processing unit, and a projection lens 86 that projects the image of the liquid panel 82 onto the screen 10. The projection-type display 8 is capable of displaying desired image information on the screen 10.

Since the screen 10 is provided with appropriate light diffusibility for the purpose of widening the range of observing a projected image, the optical beam emitted from the designation device 4 is also diffused at the position of the light spot 5, and part of light emitted at the position of the light spot 5 is let in the coordinate detector 1 whatever the position on the screen or the direction of the optical beam may be.

By making configuration as described above, character information and line drawing information are inputted on the screen 10 by the designation device 4 and the information is displayed by the projection-type display 8, whereby information can be inputted and outputted as if do so with "paper and pencil" relationship, and in addition, input operation such as button manipulation and selection and determination of icons can be performed freely.

Details of the optical coordinate input apparatus of the present invention will be specifically described below.

Description of Designation Device

FIG. 3 is a schematic diagram showing an internal configuration of the designation device.

The designation device 4 includes therein the light emitting element 41 such as LED or the like emitting infrared lights, the light emission control means 42 for performing drive control of the emission, a power unit 44 and two operative switches 43A and 43B for this example.

The light emission control means 42 performs light emission control with control signals being superimposed, by means of ON/OFF of light emission and modulation described later according to the state of the operative switches 43A and 43B.

An operator grips the designation device 4 to point the front-end thereof to the screen 10. At this time, by pushing down the operative switch 43A or abutting the operative switch 43B to the screen, infrared lights are emitted. Thereby, the light spot 5 is generated on the screen 10, and the coordinate signal starts being outputted by predetermined processing.

The infrared light includes presence or absence of modulation, encoded switch information and a pen ID, and the coordinate detector reads this information, and the control means 3 sends the coordinate value, switch information and the ID to a host computer.

On the host side, when the operative switch 43B receives information of ON state for example, it is determined that there is an initial input (pen down), and operations are performed as in the case of the left click of the mouse for use in the personal computer. In the case of a drawing program and the like, it is possible to draw lines and so on under this condition. Also, it is possible to use the operative switch 43A as the right button of the mouse.

The LED starts emitting lights once any one of the switches turns ON, and continues to emit the lights for a certain time period even after the switch turns OFF. In this state, only the cursor on the screen moves. Thereby, the operator can draw characters and graphics speedily and correctly in any position on the screen 10 by one hand, and can perform operations with agility by selecting a button and menu, and so forth.

The light emission time may be determined considering the lifetime of the battery, and emission light time of several tens of seconds can provide adequate agility in terms of usage.

In this example, switch information is superimposed on the infrared light in two ways. The switch information of the operative switch 43B is updated relatively frequently, and is thus expressed by modulation the infrared light.

Figure 7:
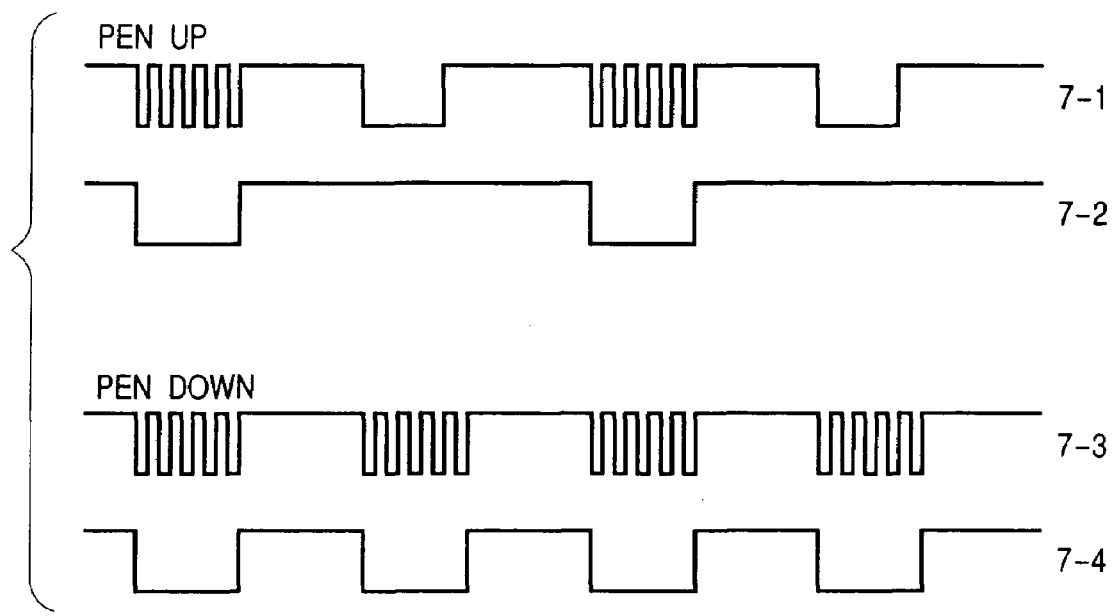
FIG. 7 is a timing chart of a signal waveform expressing operations of reconstructing a control signal from an output signal of a light reception element.
Figure 8:
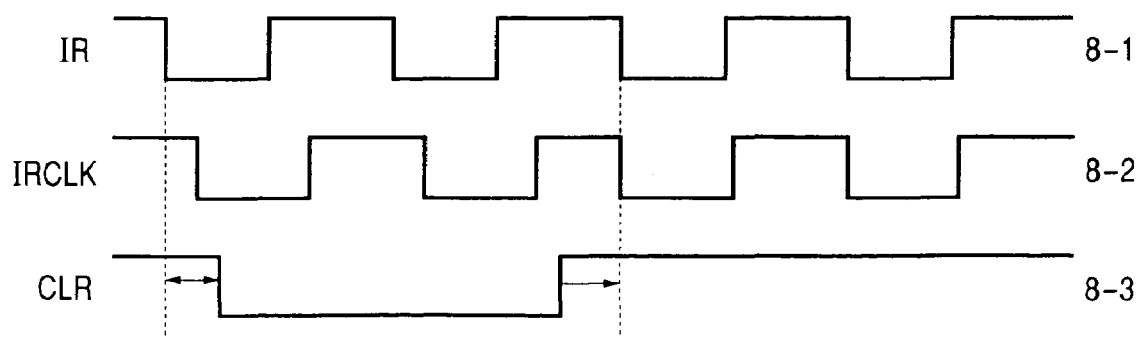
FIG. 8 is a timing chart of synchronous timing generated from the output signal of the light reception element.

As shown in FIG. 7, when input is ended (pen-up) and the switch 43B is in the sate of OFF, modulated lights and unmodulated lights are emitted alternately (7-1). When input is started (pen-down) and the operative switch 43B is in the sate of ON, only the modulated light is outputted at every time (7-2).

The coordinate detector 1 detects this light in the light reception element 6, and fetches only the modulated light using frequency detecting means (7-2, 7-4). Determination as pen-down is made if the fetched light is continuous within a certain time period as in the case of 7-4, and determination as pen-up is made if it has an interval as in the case of 7-2.

Figure 16:
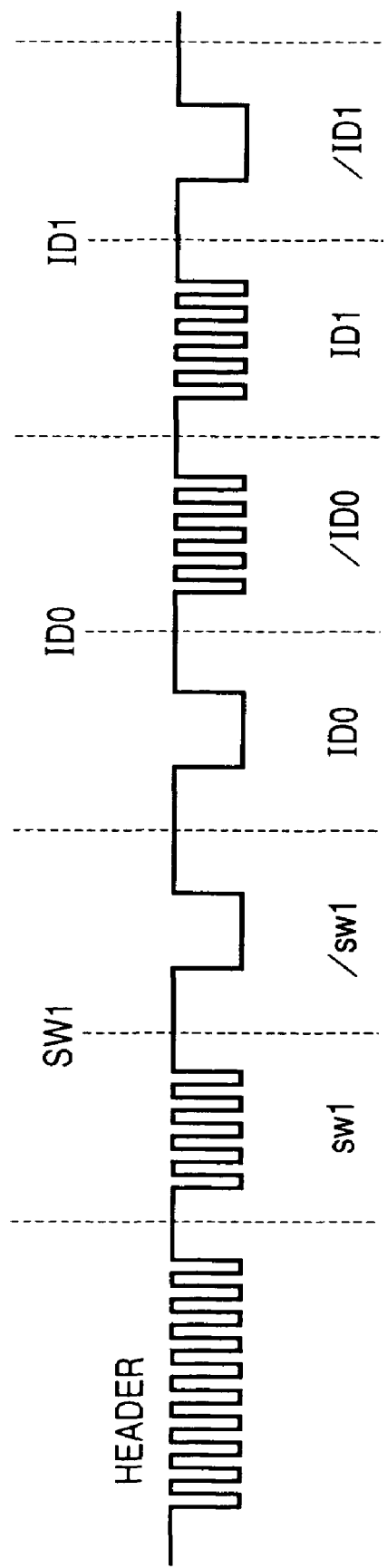
FIG. 16 is a waveform diagram showing an example of the output of a switch signal.

The operative switch 43A and the pen ID are passed by means of another method. That is, a header portion is provided, and when this header is detected, ON and OFF of the operative switch and the pen ID are determined from the following pattern of the modulated light. This too expresses the state of 0 or 1 with the modulated light or the unmodulated light as described above (See FIG. 16).

Also, in the case of inverse information, for example SW1, information of /SW1 is sent as a pair, thus preventing determination errors and the like.

The case where two switches are provided are illustrated in this example, but the present invention is not limited thereto, and more switches may be mounted. Also, the role of each switch can be redefined by the driver on the host side, and one matching user's using pattern may be selected.

Description of coordinate detector (Ring CCD)

Figure 4:
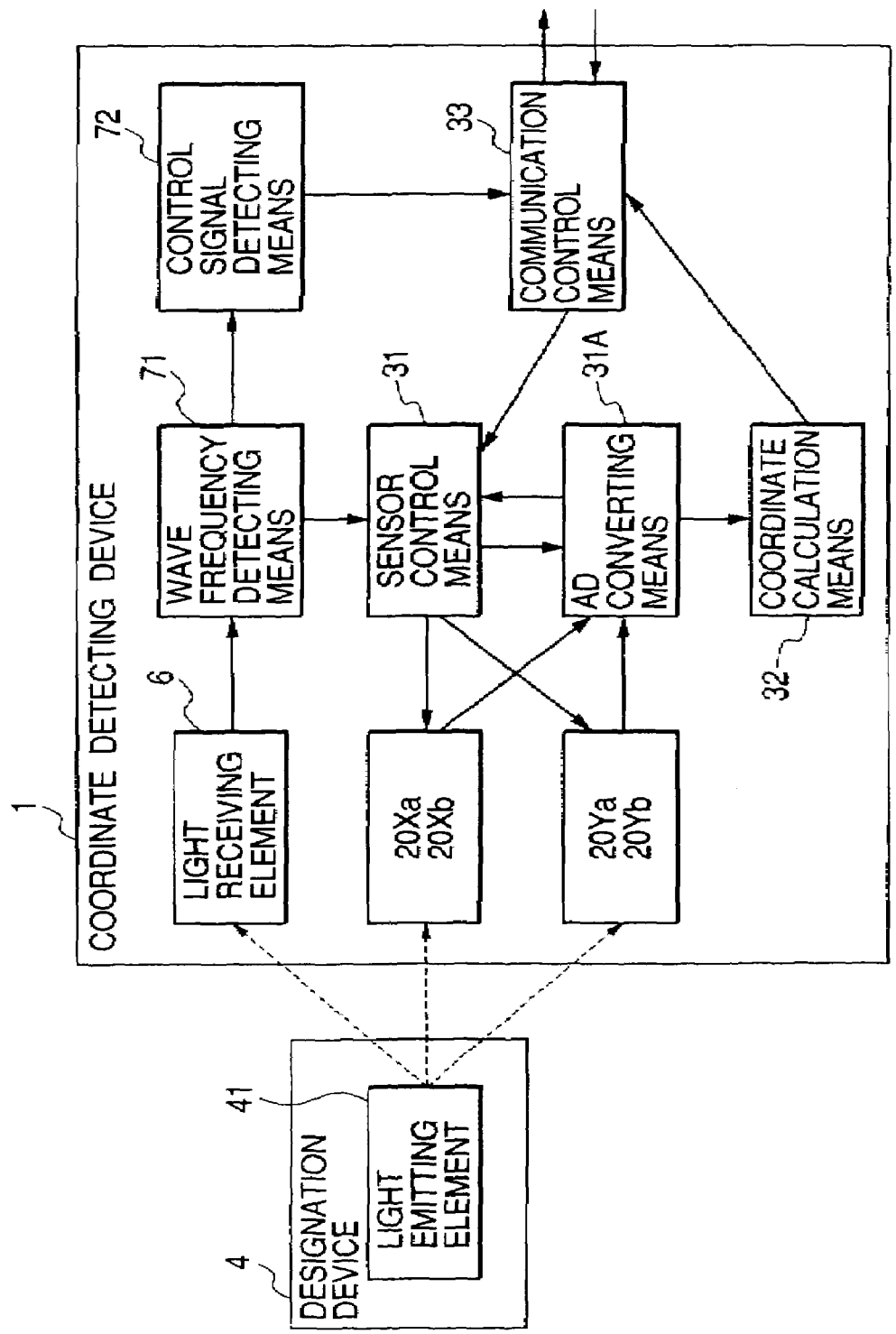
FIG. 4 is a schematic diagram showing an outlined configuration of a coordinate detector.

FIG. 4 is a schematic diagram showing an internal configuration of the coordinate detector 1.

This coordinate detector is provided with a light reception element 6 detecting the amount of light with high sensitivity by a light convergence optical system, and four linear sensors 20Xa, 20Xb, 20Ya and 20Yb detecting the direction of the arrival of light by an image formation optical system, wherein diffused lights from the light spot 5 generated on the screen 10 are received respectively, with light beams from the light emitting element 41 included in the designation device 4. Here, the controller 3 is comprised of sensor control means 31, AD converting means 31A, coordinate computing means 32 and communication control means 33, and the signal processing unit 7 is comprised of frequency detecting means 71 and control signal detecting means 72.

Description of Light Convergence Optical System (Timing Sensor)

The light reception element 6 is equipped with a light conversion lens as a light conversion optical system, wherein the light having a predetermined frequency is detected with high sensitivity from the whole range on the screen 10. This detection output is detected by the frequency detecting means 71, and then the digital signal including data such as the control signal (signal superimposed by light emission control means 42 of the designation device 4) is demodulated in the control signal detecting means 72.

Also, in this example, because means such as a cord for sending a timing signal is absent, the linear sensors 20X and 20Y are controlled with the modulated signal.

As will be described later, since in order that signal detection is performed with a differential between light emission and no-light emission, the shutter timing and the light emission timing are made to match each other, the timing of the above described modulated signal is used to generate a reset signal of the CCD.

Reference numeral 8-1 denotes a signal after the modulated signal at the time of pen-down is detected with the detecting means. Because this signal shows so-called a period over which the light is emitted, it is necessary to synchronize the shutter timing of the CCD with this signal.

The signal, IRCLK, of 8-2 expresses the shutter cycle of the CCD, showing timing of performing detection of light emission at the time of LOW and performing detection of no light emission at the time of H1. This signal is outputted from the CCD by a clock supplied to the CCD. For synchronizing this signal with a light emission period, a clear signal (8-3) is outputted to the CCD with a certain amount of delay time long enough for IR and IRCLK to synchronize with each other, when IR signal (8-1) is detected. This clear operation enables synchronization. The delay amount may be determined by the time over which IRCLK turns to LOW after the end of CLR.

Description of Image Formation Optical System

Figure 5:
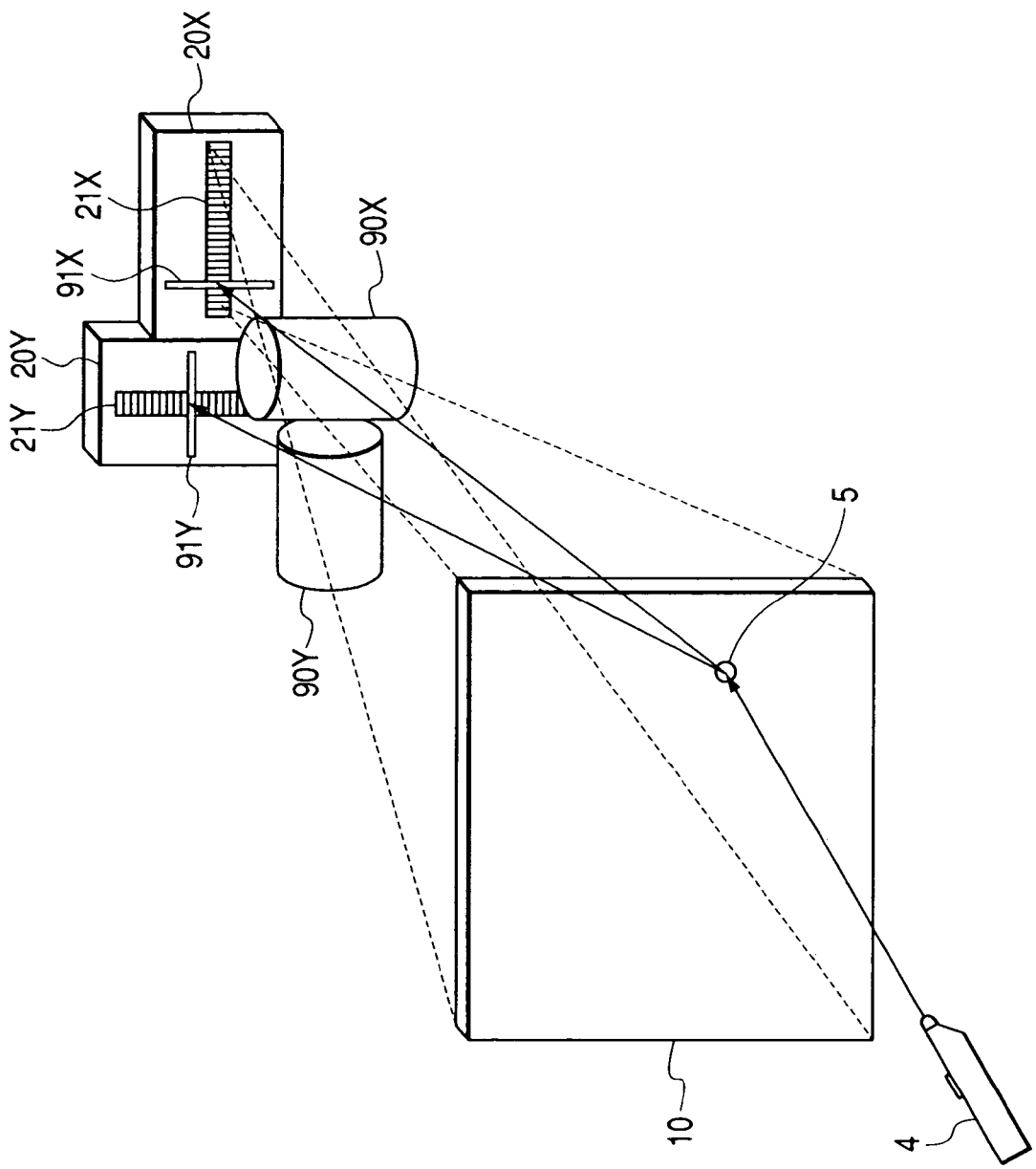
FIG. 5 is a schematic diagram showing a relative placement of linear sensors.

FIG. 5 is a schematic diagram showing relative displacement of two linear sensors 20Xa, Xb, 20Ya, Yb.

By cylindrical lenses 90Xa, 90Xb, 90Ya and 90Yb as the image formation optical system, the image of the light spot 5 is formed linearly on the photosensitive portion 21Xab, 21Yab of each sensor. By placing these two sensors correctly at the right angle, outputs having peaks in pixels reflecting the X coordinate and the Y coordinate, respectively can be obtained.

And, these four sensors are controlled by the sensor control means 31, the output signal is sent to the coordinate computing means 32 as the digital signal by the AD converting means 31A connected to the sensor control means 31 to calculate an output coordinate value, and the result thereof is sent to an external controller (not shown) via the communication control means 33 by means of a predetermined communicating method, along with data of the control signal and the like from the control signal detecting means 72.

Here, the sensor control means 31 includes determining means for determining a readout portion of each sensor from coordinate data stored in storing means, whose ordinal number equals a number immediately before a predetermined number, at the time of calculating the coordinate data of the predetermined ordinal number.

Also, for having performed operations different from normal operations like those during adjustment (for example, setting of user-corrected values), a mode switching signal is sent from the communication control means 33 to the sensor control means 31 and the coordinate computing means 32.

In this example, blurs are constructively produced by means of focus adjustment or using diffusion films so that the image of the light spot 5 has image width several times as large as a pixel of each sensor. Since high level of blurs result in reduced peak levels as a matter of course, the image width of several pixels is appropriate. In this way, one of the points of this example lies in use of a CCD with a small number of pixels and an optical system appropriately blurred, and a combination like this is used, thereby making it possible to achieve a coordinate input apparatus of extremely high resolution, high accuracy, high speed and inexpensiveness, with a small amount of computational data, and with small sensors and optical systems.

Figure 6:
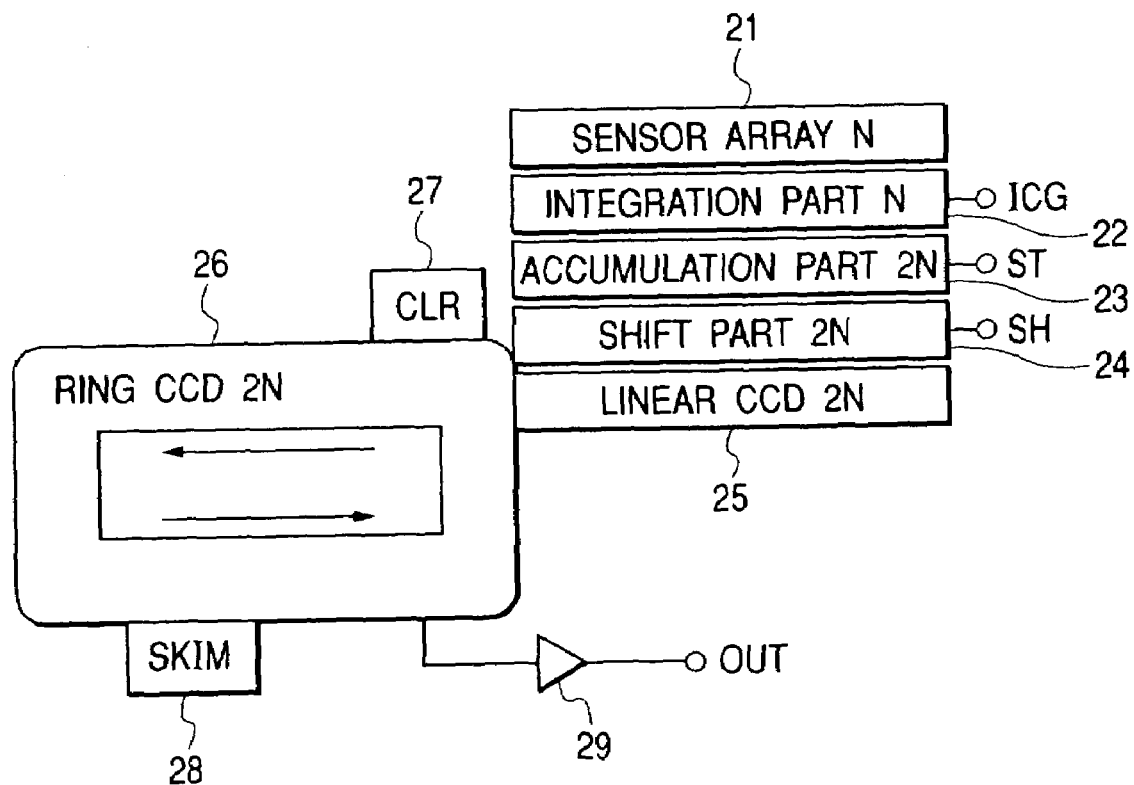
FIG. 6 is a block diagram showing an internal configuration of the linear sensor.

Linear sensors 20Xa and 20Xb for detection of X coordinates and linear sensors 20Ya and 20Yb for detection of Y coordinates that are aligned like an array have same configurations, respectively, and the internal configuration thereof is shown in FIG. 6.

A sensor array 21 that is a light receiving unit is comprised of N pixels (64 pixels in this example), electric charges appropriate to the amount of received light are accumulated in an integration unit 22. The integration unit 22, which is comprised of N pixels, can be reset by applying a voltage to a gate ICG, thus enabling electronic shutter operations. Electric charges accumulated in this integration unit 22 are transferred to an accumulation unit 23 by applying a pulse voltage to an electrode ST. In this accumulation unit 23, which is comprised of 2N pixels, electric charges are accumulated separately corresponding to the H (high level) and L (low level) of the signal IRCLK, that are synchronized with the light emitting timing of the designation devices respectively.

Thereafter, the electric charges separately accumulated synchronizing with the flashing of lights are transferred to a linear CCD unit 25 comprised of 2N pixels via a shift unit 24 comprised of 2N pixels, which is provided for simplify a transfer clock. Thereby, electric charges corresponding respectively to the flashing of lights in sensor output of N pixels are stored in alignment such that they are neighboring one another in the linear CCD unit 25.

These electric charges stored in alignment in the linear CCD unit 25 are transferred in succession to a ring CCD unit 26 comprised of 2N pixels. This ring CCD 26 is emptied by a signal RCL at a CLR unit 27, followed by accumulating in succession electric charges from the linear CCD unit 25.

Electric charges accumulated in this way are read out by an amplifier 29. This amplifier 29 outputs a voltage proportional to the amount of accumulated electric charges in a non-destructive manner, and in fact amplifies a differential between the amounts of electric charges neighboring each other, namely a value obtained by subtracting the amount of electric charges when the light emitting element 41 is unlit from the amount of electric charges when it is lit, and outputs the same.

Figure 9:
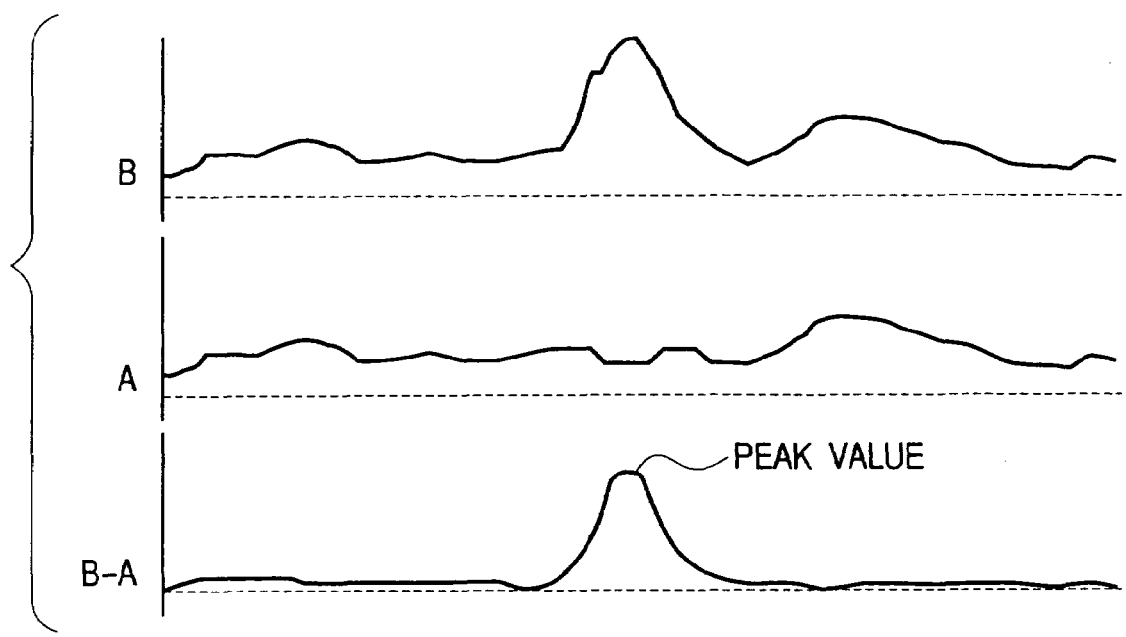
FIG. 9 is a waveform diagram showing an example of an output waveform of the linear sensor.

One example of output waveforms of linear sensors 20X and 20Y that are obtained at this time is shown in FIG. 9.

In this drawing, B denotes a waveform at the time of reading out only a signal when the light emitting element 41 is lit, and A denotes a waveform when it is unlit, namely a waveform of only external random light (As shown in FIG. 6, electric charges of pixels corresponding to these waveforms of A and B are aligned in such a manner that they are neighboring each other in the ring CCD 26).

The amplifier 29 amplifies a differential between the amounts of electric charges neighboring each other (waveform of B-A) in a non-destructive manner and outputs the same, whereby the signal of the image of lights only from the designation device 4 can be obtained, thus enabling stable coordinate input without influence by external random light (noise).

Also, assuming that the maximum value of the waveform of B-A shown in FIG. 9 is defined as a peak value, the accumulation time period over which the sensor operates against lights is increased, whereby the peak value is increased in accordance with the time period.

In other words, if the time of one cycle of the signal IRCLK is set to be a unit accumulation time period, and the number of times of accumulation n is defined with the unit accumulation time period as a unit, the peak value is increased by increasing the number of times of accumulation n, and it is detected that this peak value reaches a predetermined magnitude TH1, thereby making it possible to obtain an output waveform having constant quality at all times.

On the other hand, if the external random light is extremely strong, transferred electric charges of the ring CCD 26 may reach a level of saturation before the peak of the differential waveform (B-A) grows into an adequate size. Considering such a case, the sensor is provided with a skim unit 28 having a skim function.

Figure 10:
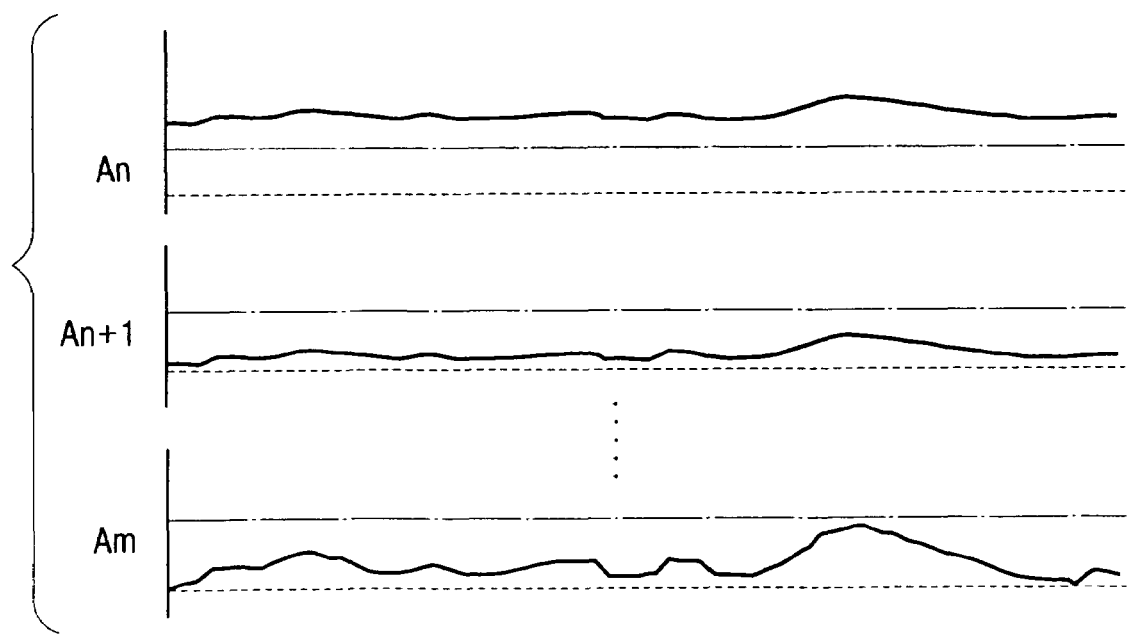
FIG. 10 is a waveform diagram showing skim operations of the linear sensor.
Figure 11:
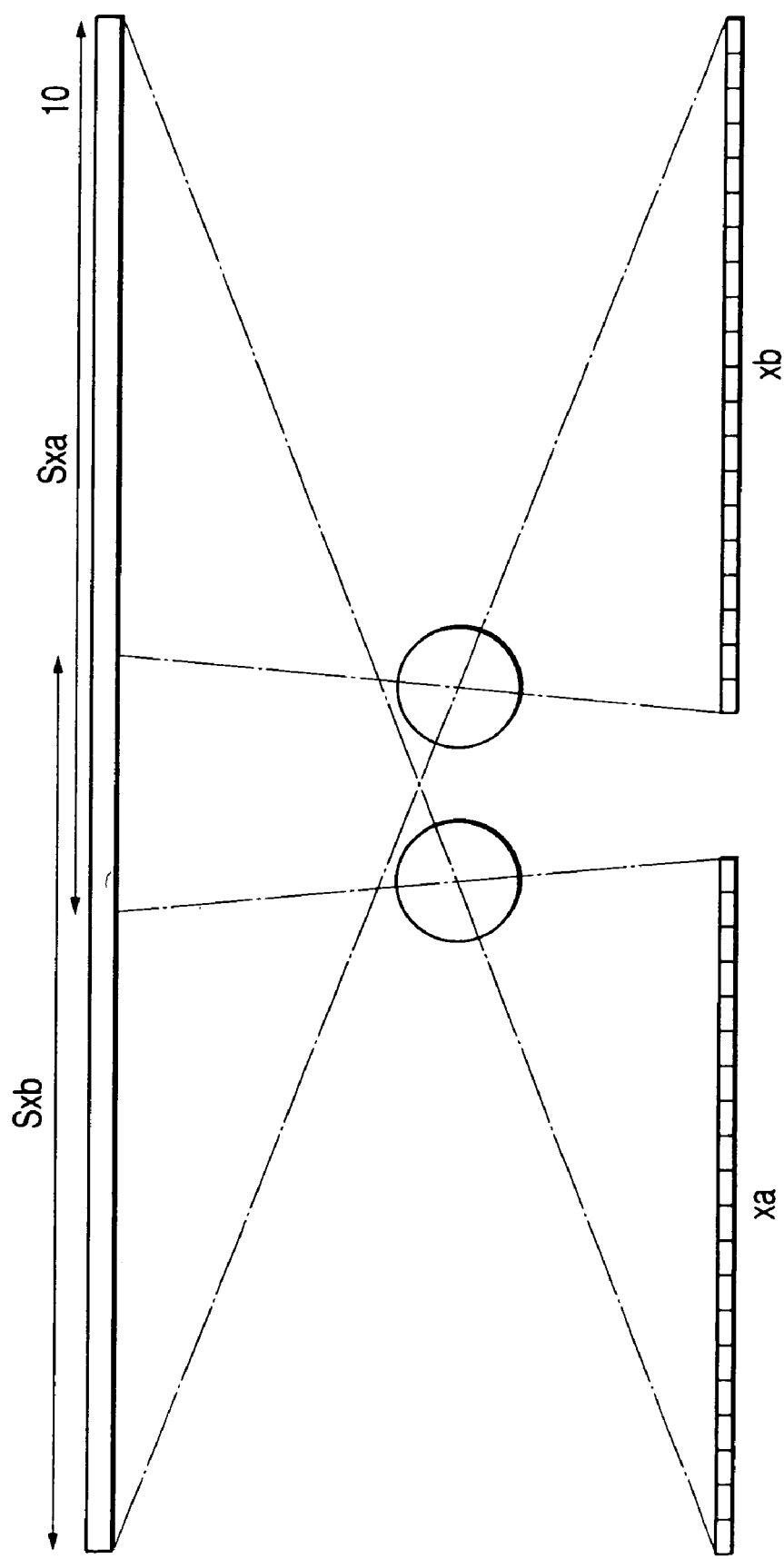
FIG. 11 is a schematic diagram showing a connection of a plurality of CCDs.

The skim unit 28 monitors the level of the unlit signal, and in FIG. 10, takes a certain amount of charges out of pixels of A and B if the signal level exceeds a predetermined value with nth An (one point linkage in the figure).

Thereby, it develops into a waveform as shown by (An+1) for a next (n+1) time, and by repeating that, saturation is never reached in spite of very strong external light, thus making it possible to continue accumulation of signal charges.

Therefore, even though the amount of flashing light is slight, an adequately large signal waveform can be obtained by continuing multiple integration operations.

Especially, when a light emitting source in the visible region is used for the designation device, a sharp waveform with very little noises can be obtained by using the aforesaid skim function and differential output, because the signal of the displayed image is superimposed.

Description of Timing

Figure 13:
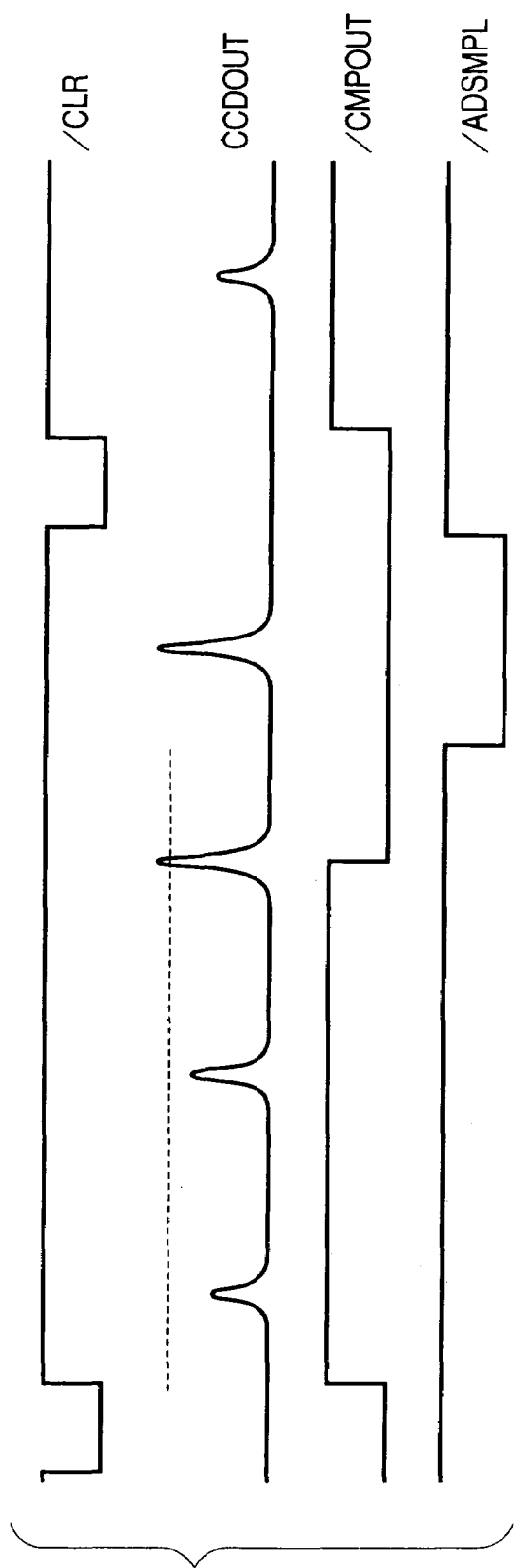
FIG. 13 is a timing chart of a CCD output control.

FIG. 13 is a flowchart showing the timing of a series of operations.

First, all the operations are cleared by the CLR signal after certain delay time from the IR signal. Thereafter, if there is an input from the designation device, the detection signal is enlarged through integration operations as in the case of the CCDOUT signal.

When a certain level (VTH) is exceeded, the output CMPOUT of a comparator drops to stop the integration operation of the CCD. The control means starts AD conversion when this signal drops. The AD conversion is performed for all pixel outputs of the CCD, as shown by ADSMPL.

As described above, if the CCD output does not exceed a threshold value, the control means counts elapsed time after clearing, and if certain time determined in advance elapses, it performs AD conversion operations compulsorily. By so doing, even in the case of small input, sampling can certainly performed within certain sampling time.

Figure 14:
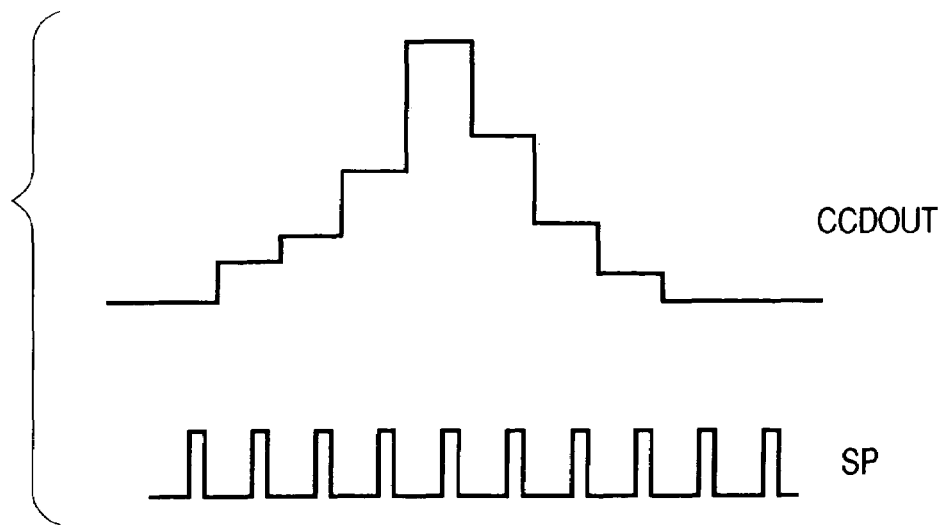
FIG. 14 is a timing chart of an AD conversion timing.

AD conversion is performed in timing as shown in FIG. 14.

When the time axis is scaled up, the CCD output CCDOUT is outputted at a voltage appropriate to the detection light level with the pixel as a unit as shown in FIG. 14. This signal is subjected to AD conversion for each pixel in timing of the sampling pulse SP, and the control means records the level thereof in the memory and the like. Operations as described above are carried out for every CCD corresponding to each coordinate axis to perform coordinate calculation described below.

As described above, since a carrier of high frequency is added to the flashing light and timing control of integration operations is performed with a demodulated signal of predetermined cycle obtained by subjecting the carrier to frequency detection, the designation device 4 and the coordinate detector 1 can be synchronized with each other cordlessly, thus making it possible to achieve a coordinate input apparatus having excellent usability.

Also, since integration control means for detecting that the peak level in the differential signal from the integration means exceeds a predetermined level to stop integration operations is provided, signals of almost constant level of spot light images can be generated even if the amount of light is changed, thereby making it possible to obtain results of coordinate computation with high stability and high resolution at all times.

Computation of Coordinate Values

Coordinate computation processing in the coordinate computing means 32 will be described below.

Output signals of four linear sensors 20Xa, 20Xb, 20Ya and 20Yb (differential signals from the amplifier 29) obtained as described above are sent to the coordinate computing means 32 as digital signals by the AD converting means 31A provided in the sensor control means 31 to calculate coordinate values.

As shown in FIG. 5, because similar configurations are provided in terms of 20Xa and 20Xb, and 20Ya and 20Yb, computation of the X coordinate will be described below.

The linear sensors 20Xa and 20Xb perform detection of one side of the screen 10, respectively, and detected areas overlap one another near the center thereof. The sensor Xa detects light on the CCD when the light spot exists in the Sxa area of the screen, while the sensor Xb performs detection when the light spot exists in the SXb area. Detection is performed by both sensors in the overlap area.

Assume that coordinates detected by respective sensors are CCDXa and CCDXb.

Figure 15:
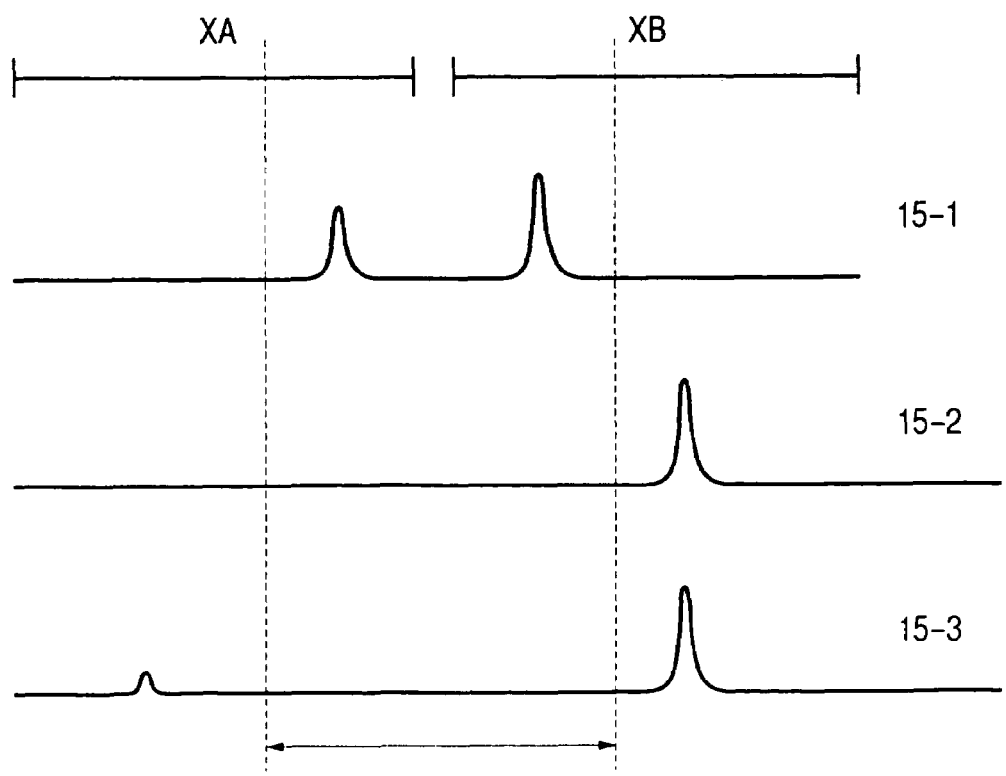
FIG. 15 is a schematic diagram showing the CCD output signal.

FIG. 15 is a characteristic view showing schematically CCD output at that time.

If there exists a light spot in the overlap area at the center, outputs appear for both sensors Xa and Xb. On the other hand, if there exists a light spot in the SXb area, an output appears only for the sensor Xb.

In this way, ideally, if there is an output on one side in an area other than the overlap area, determination of switching may be made according to whether or not the value exceeds a specified point on the basis of one coordinate value to couple coordinate values.

However, there may be cases where the output occurs in a place other than the original light spot due to noises, leaked lights, external random lights or the like (See 15-3 in FIG. 15). In this case, if determination is made with one coordinate value, erroneous determination may be made causing a cursor or the like to be displayed suddenly at a different point on the display screen. In this case, if drawing is being performed, unnecessary lines will be drawn.

In this example, determination is made according to the peak value of data of the CCD output obtained to avoid such a situation.

Since Dxa and Dxb are values subjected to AD conversion as described above, voltage values appropriate to the amount of detected light for each pixel written by CCD are stored. Thus, the maximum value of each data may be considered as the peak level.

Figures 1, 17:
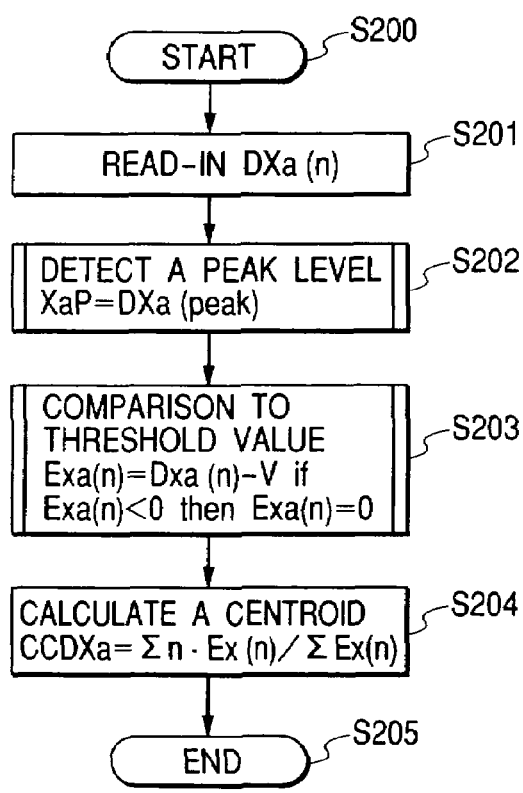
Figures 2, 17:
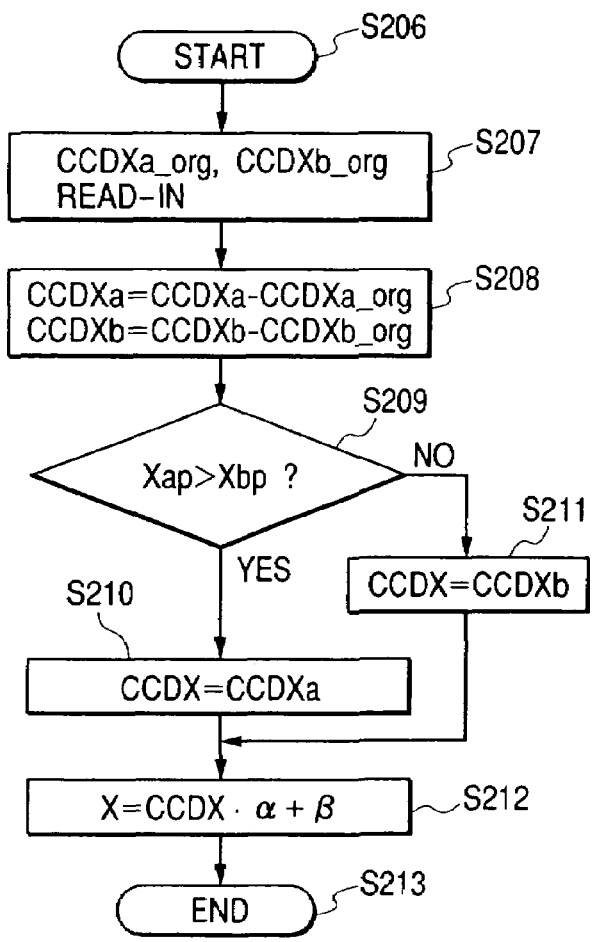

FIG. 17 is a chart showing a flow of coordinate computation processing.

Processing is started in Step S200, and in Step S201, differential data Dxa (n) (in the case of this example, the number of pixels n=64) that is a differential signal of each pixel at an arbitrary coordinate input point is read and stored in a buffer memory.

In Step 202, the peak level of this data is determined, and is stored as Xap.

Then, in Step S203, comparison with a predefined threshold value V is performed to derive a data value Exa (n) larger than the threshold value.

This data is used to calculate a coordinate CCDXa on the sensor in Step S204.

In this example, the barycenter of output data is calculated using a barycentric method, but there is a plurality of calculating methods such as methods in which the peak value of output data Exa (n) is determined (for example, differentiation) and so on, as a matter of course.

For CCDXb, calculation is performed in a similar way.

These obtained coordinate values are sensor coordinates corresponding to pixels on individual CCDs, and they can be treated as the coordinate value on one CCD by coupling these coordinate values. For this purpose, a reference coordinate may be determined for coupling the both CCDs.

Figure 12:
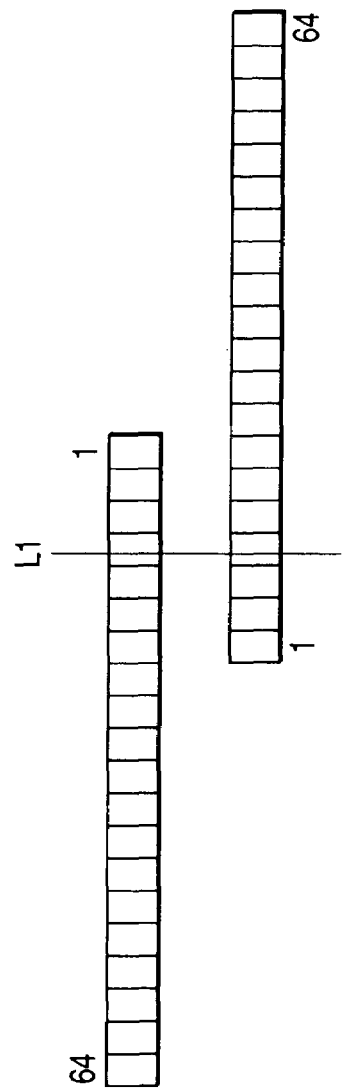
FIG. 12 is a schematic diagram showing a CCD coordinate coupling.

FIG. 12 is a schematic diagram of coordinates of both CCDs of Xa and Xb being aligned conceptually.

The detected area of the CCD has overlap area as described previously, and a superimposing of its coordinate position upon another results in a form as shown in this figure. At this time, input of the reference point is performed in measurable areas in advance for both CCDs.

That is, input in the overlap area on the screen is performed, and the above described CCD Xa and Yb coordinates are calculated. These values are stored in a nonvolatile memory such as an EEPROM as reference point data, and they are read out to perform calculation in the case of normal usage.

These reference point data are used to calculate coupled CCD coordinates CCDX.

To provide an explanation according to 17-2 described in FIG. 17, the reference point data of the both CCDs are first read from the memory (s 207).

Then, differences between the values of CCDXa and CCDXb that are calculated when input is done and the reference point data are calculated (s 208). By so doing, they are converted into coordinates on the CCD with a point on the line L1 near the center of FIG. 12 defined as an origin point.

Here, comparison is made on each of peak values (XaP, XbP) stored in the previous step.

Since the signal by external random and the like is much smaller than the signal by normal light spots, one with a larger peak value is adopted as a normal coordinate (s 209). In this way, the values of both CCDs can be coupled with L1 as a boundary.

Conversion from the CCDX coordinate value obtained in this way to the coordinate value on the screen can be performed by making a measurement in advance and using a scaling factor α and offset β stored in the nonvolatile memory or the like as shown in s 212.

For the scaling factor α and offset β, input work is performed in advance at two or more known points, and a conversion may be made from the CCD coordinate at that time and the coordinate value on the screen, as in the case of the reference point.

Explanations about the X coordinate have been provided above, and similar things apply to the Y coordinate.

The data signal indicating the coordinate value (X, Y) determined through computation processing as described above is sent from the coordinate computing means 32 to the communication control means 33. The data signal and the control signal from the control signal detecting means 72 are inputted in this communication control means 33.

And, these data signal and control signal are both converted into predetermined communication signals, and are sent to an external display control device. Thereby, a various kinds of operations such as the cursor and menu on the screen 10 and input of characters and drawings can be performed.

Description of Block Splitting CCD

Examples of CCDs for reading out continual data have been described above, there are CCDs capable of reading out by means of block splitting for reading out data more speedily.

Figure 1:
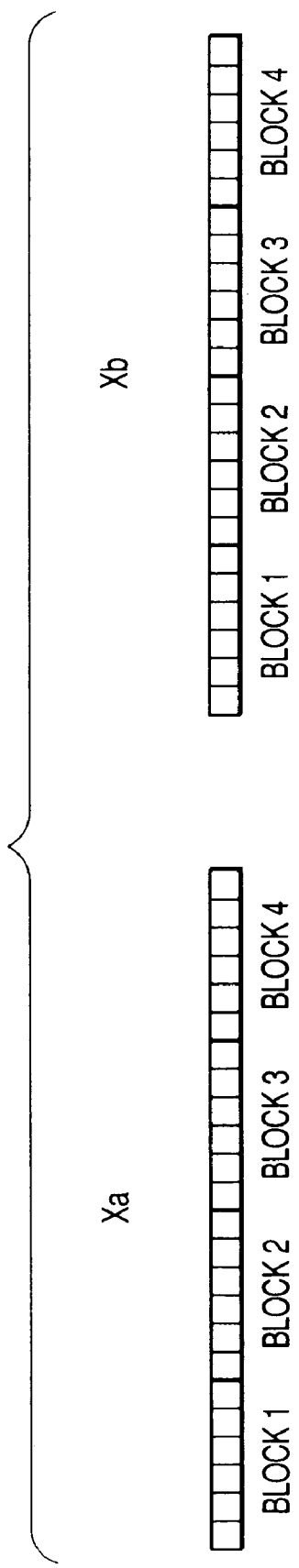
FIG. 1 is a schematic diagram showing an example of block splitting of a CCD.

FIG. 1 is a schematic diagram showing one example thereof.

The CCD has its light receiving unit split into four areas, each of which is capable of reading out data.

Figure 19:
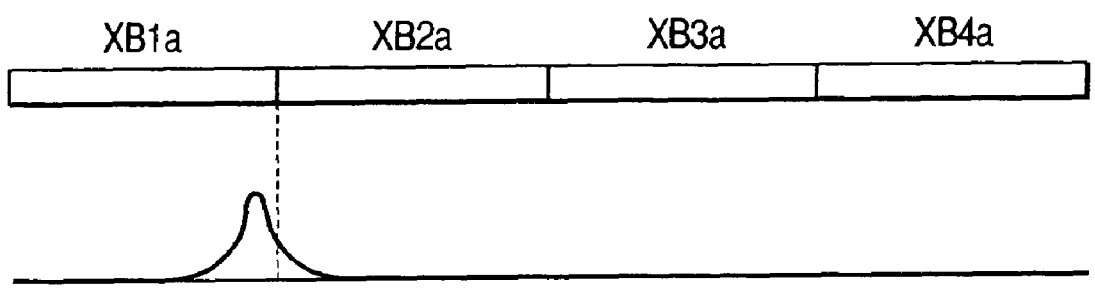
FIG. 19 is a schematic diagram showing an example of detection across block pairs.

As described above, however, data with width of plurality of pixels are needed for calculation of coordinates, and when an input occurs just in the vicinity of block splitting, coordinate calculation cannot be performed by reading out only one block (See FIG. 19). Thus, readout is performed for each pair of neighboring blocks. Specifically, readout is performed for blocks 1–2, 2–3, 3–4, thereby making it possible to perform readout successively even when data is positioned at the end point of a predetermined block.

Each block in FIG. 1 has 32-bit width, and when summed, 128-bit information is possessed on one side, in this example. Resolution is improved as the bit number is improved, but much time is required for reading out data, accordingly. If it takes too much time, the input speed may be influenced to compromise agility in terms of usage. Thus, in this example, reduction in speed is prevented by performing readout for each block.

Description of Block Prediction Using Coordinate Values

Figure 18:
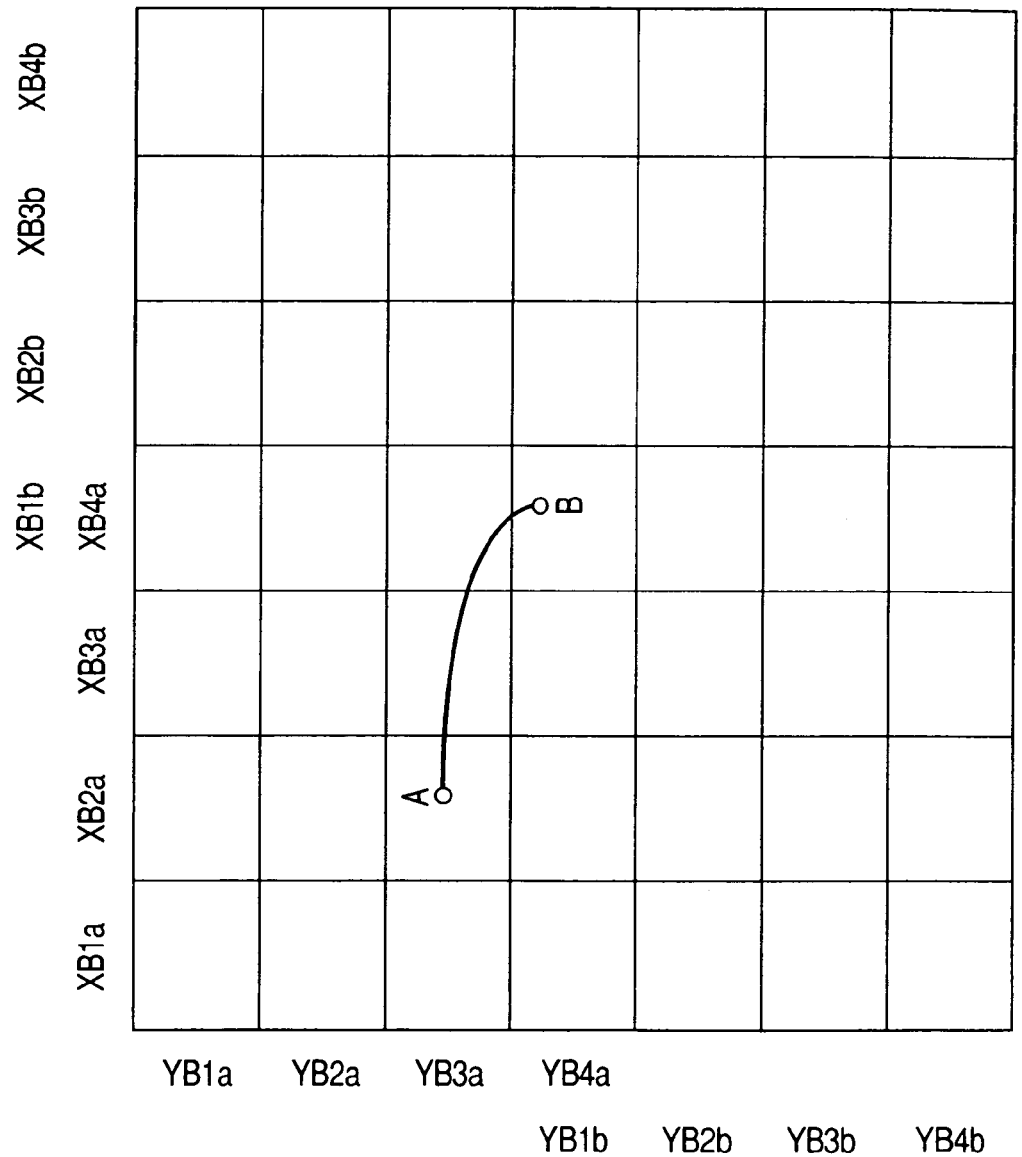
FIG. 18 is a schematic diagram showing an example of screen splitting corresponding to the CCD block.

If a CCD as described above is used, assuming that the portion where Xa and Xb overlap each other corresponds to the areas of a block 4 and a block 1 thereof and the same goes for Ya and Yb, coordinates on the screen corresponds to respective blocks as shown in FIG. 18.

Now, for obtaining X coordinate data of a point A when input from the A point to a B point is done, a block pair of XB1$a$:Xb2$a$ or a block pair of XB2$a$:Xb3$a$ is read out, thereby obtaining data.

In a similar way, for the coordinate of the point B, a pair of XB3$a$:XB4$a$ or XB1$b$:XB2$b$ may be read out.

The same goes for the y coordinate.

In the case of the point B or the like, since detection is finally done with the last pair if readout is carried out one after another beginning with XB1$a$, readout of XB1$a$:XB2$a$ and XB2$a$:XB3$a$ comes to nothing, thus causing a loss of time.

In the case of normal input, the shift of coordinate values is continuous for a write except for the initial input. Thus, in this example, a next data inclusion block is determined to obtain data in such a way as to reduce a loss, based on the coordinate data immediately preceding, stored in predetermined storing means.

Figure 20:
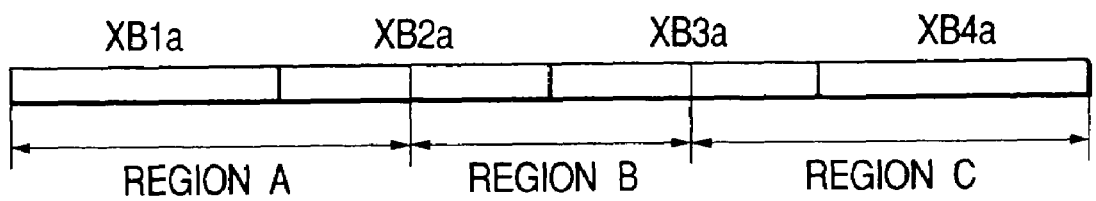
FIG. 20 is a schematic diagram showing an example of area splitting for determining detection blocks.

FIG. 20 is a schematic diagram showing one example of the block splitting CCD.

Areas of XB1$a$ and XB4$a$ will be described for simplification, but the same will go for other blocks.

Here, area splitting is performed for each specific coordinate value of each block. Regions A, B and C are determined so that the coordinate value determined according to the pixel width of input light is included at the end point of each block, for example if the pixel width of input light equals nine points.

In the case where the previous coordinate value existed in the region A, present data obtainment is performed with the pair of Xb1$a$:Xb2$a$.

In the case where the present coordinate value exists in the region B, next data obtainment will begin with the pair of Xb2$a$:Xb3$a$.

Block pairs for inclusion are shifted to obtain data before the coordinate value obtained in this way reaches the end point of each block, whereby the speed of data obtainment can be enhanced.

Also in the case of the initial input (pen-down), data obtainment is performed in a similar way on the basis of the last coordinate (pen-down coordinate) of the previous write because there is a case of input in the vicinity, in the case of the normal write.

Description of the flowchart of block prediction using coordinate values

Figure 21:
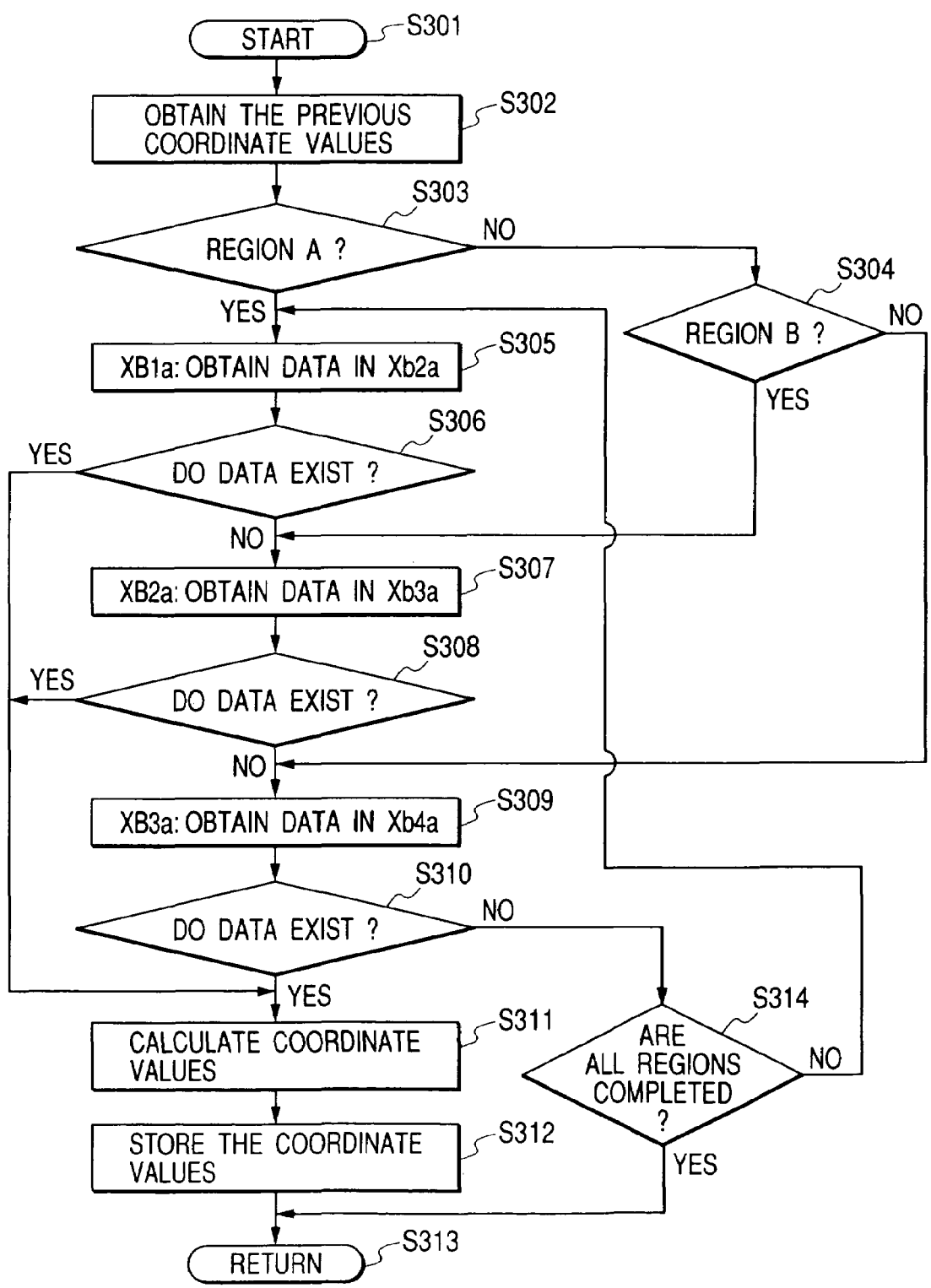
FIG. 21 is a flowchart of area determination with a previous coordinate.

FIG. 21 is an example of a flowchart of block prediction using coordinate values.

First, coordinate data which is called from a main routine or the like and for which execution is started in Step S301, and which is previously obtained and is stored in storing means such as a memory in Step S302 is read out.

Next, if whether or not the read coordinate value belongs to the region A is determined in S303, and it is determined that the value belongs to the region A, the block pair of XB1$a$:Xb2$a$ is used to obtain data in S305.

Here, if the data can be obtained, a jump to coordinate calculation S311 is made to calculate a coordinate. The calculated coordinate value is stored in the memory or the like, and a routine is ended (S313).

If the data cannot be obtained in S306, detection is continued until other blocks can be obtained in succession. In the case where it is determined that the data does not exist in the region A in S303, whether or not it belongs to the region B is determined in S304.

Diversion to S307 is made if the data belongs to the region B, and if it is determined that the data does not belong to the region B, then diversion to S309 is made to perform each data obtainment because it belongs to the region C, and whether or not the data exists is determined as in the case of S306, and other blocks are observed according to the result thereof, or advancement to coordinate calculation (S311) is made in the case where the data exists.

If the data cannot be obtained in S310, coordinate calculation is not performed and a return to main processing is made, because it is determined that no light is let in the case where data of other block pairs are already obtained.

If only processing of S309 is observed, a return to S305 is made, and data processing for other block pairs is performed.

Whether or not processing for other regions has been performed is not shown in the flowchart because a flag or the like may be prepared for determination thereof.

The coordinate value obtained in this way is sent by another routine and the like to an external connection device such as a host.

As described above, with means for determining which region the previously obtained coordinate value belongs to, the block pair with which the present data obtainment is started can be determined from the result thereof, thus enabling data obtainment to be shortened significantly.

In this example, the blocks of XB1$a$ and XB4$a$ have been described, but such effects can also be obtained for other blocks using similar methods.

Also in this example, explanation has been provided using a type of CCDs of performing readout with block pairs, but similar effects can be obtained in the case of readout with blocks as units.

Furthermore, there is a type of CCDs capable of performing readout with block pairs with the left and right identical to each other, but similar effects can also be obtained in this case.

Furthermore, there is a type of CCDs capable of performing integration operations only for each block pair, but in this case, time consumed until data can be obtained can be further shortened, which is effective.

According to this example, it is possible to provide a coordinate input apparatus and coordinate inputting method with high resolution and excellent agility in terms of usage without causing reduction in speed of detection of input light, and an information display system provided with the same.

(Second Embodiment)

In normal write, for changes in coordinate values, the write speed and the like are often changed gradually except for some extreme cases. From this fact, a loss of sampling can be reduced also by predicting detected coordinates as described below.

Figure 22:
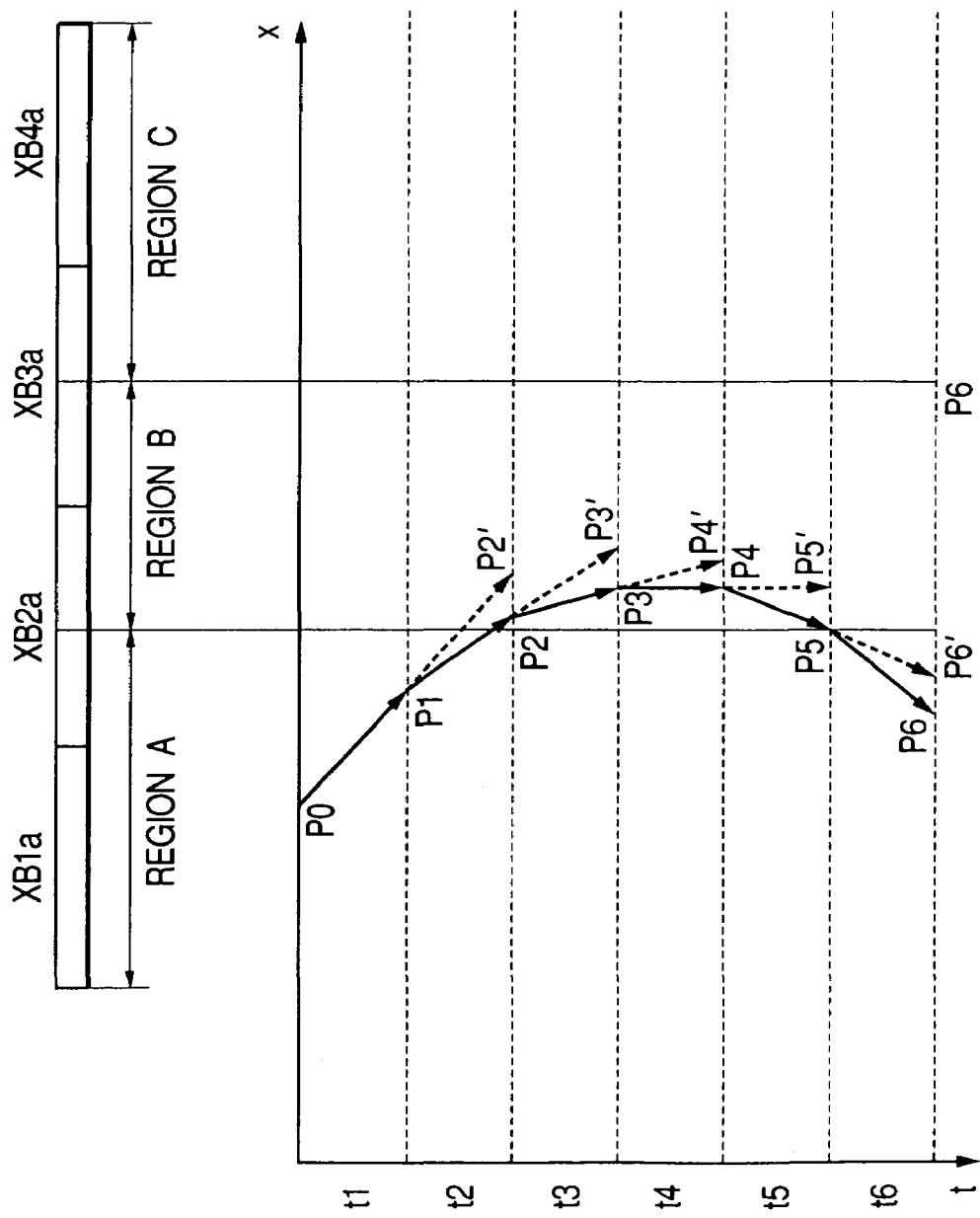
FIG. 22 is a schematic diagram showing an example of coordinate prediction.

FIG. 22 is a schematic diagram showing one example of determining the present region based on the data preceding by two times and the data preceding by three times.

Here, the vertical axis represents sampling time tn, the sampled coordinate value is represented by Pn, and the lateral axis is the X axis. Only XB1$a$ and XB4$a$ are described for simplification in this case too, but the same goes for other coordinates.

In FIG. 22, P0 and P1 are first and second coordinates, respectively. Because following calculation cannot be performed for these coordinates, processing is performed as in the case of the first embodiment.

When data of P2 is obtained, regions are determined from the values of p0 and p1.

First, the speed of the shift of the coordinate is determined from P1−P0/t1.

Time t2 elapsing until P2 is obtained is a value that can be measured using a counter such as a CPU, being determined by the time elapsing until the peak exceeds a certain threshold value or certain elapsed time, as described above.

The predicted coordinate P2' of P2 is calculated from this t2 and the aforesaid speed and coordinate value of P1.

$$P2'=((P1-P0)/t1)*t2+P1$$

If it is organized, $$Pn'=(P(n-1)-P(n-2))*(tn/t(n-1))+P(n-1) \quad (1)$$

is Obtained, and thus the Predicted Coordinate at the Pn Point can be Calculated.

Which region this value belongs to is determined to determine a block pair for data obtainment.

Figure 23:
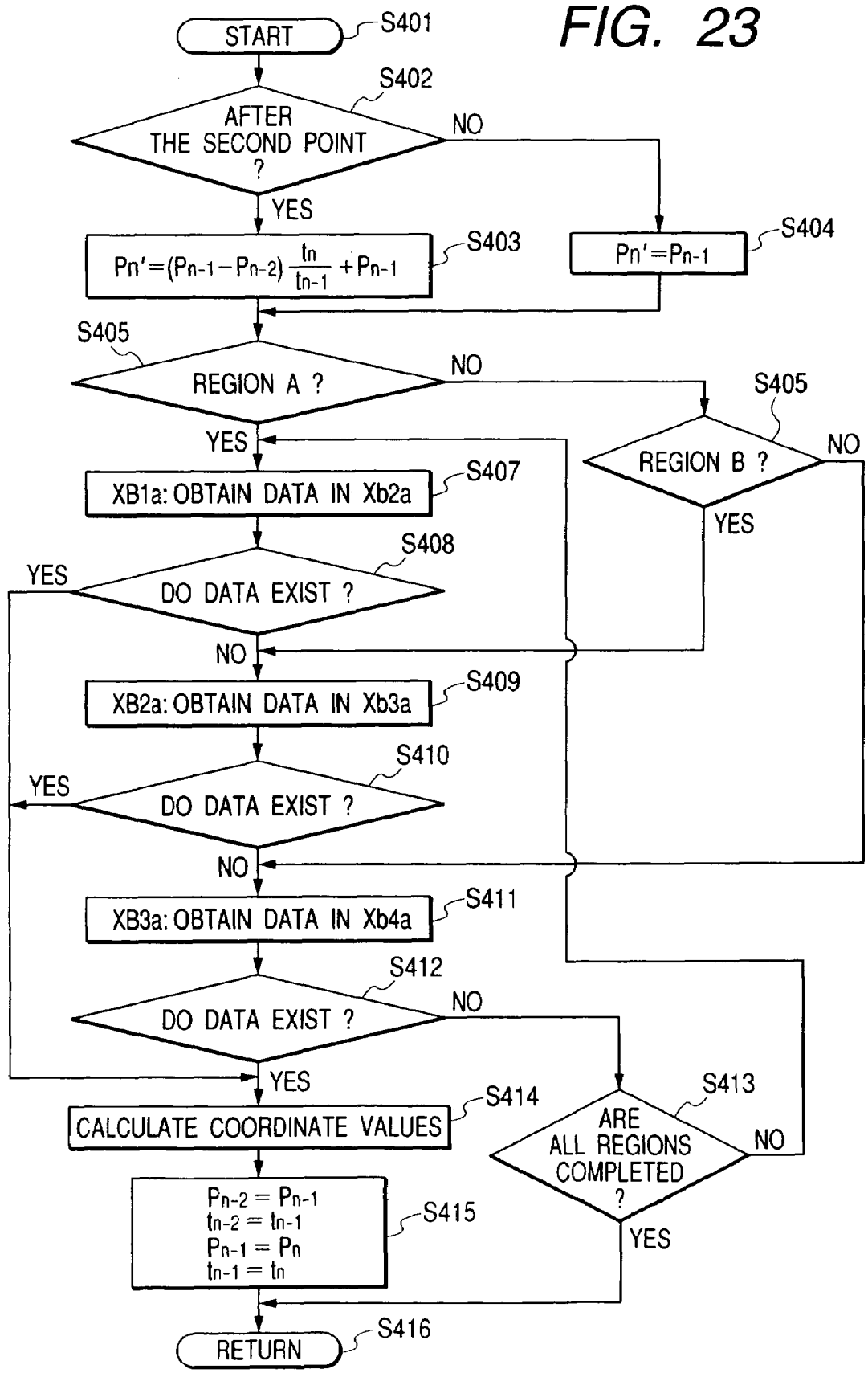
FIG. 23 is a flowchart of a coordinate prediction.

FIG. 23 shows a flowchart thereof.

When a routine is called in S401, the ordinal number of the input is first determined.

If it is first or second input, the immediately previous coordinate value is directly used to determine a region to calculate the coordinate value.

Thereafter, the immediately previous coordinate value P(n−1) and sampling time t(n−1), and the present Pn and tn are stored, respectively (S415).

In the case of input later than the second, prediction of the region is performed using values stored in S415.

In S403, Pn' is calculated using Equation (1).

This Pn' is used to perform region determination (S405), and data obtainment is performed with a block pair of 1$a$ and 2$a$ in S407 if region A, and data obtainment is performed in a corresponding region if not region A.

P(n−1) and T(n−1) are newly stored from the coordinate value obtained in this way, and predicted coordinate values are calculated to determine blocks one after another.

In this way, a coordinate value and sampling time preceding by two or more times are stored, and the present coordinate value is predicted, whereby more correct block pairs can be determined even if the write speed is increased.

Here, for a system of constant sampling time, a constant may be used without necessity to store the above described T(n−1).

According to this example, it is possible to provide a coordinate input apparatus and coordinate inputting method with high resolution and excellent agility in terms of usage without causing reduction in speed of detection of input light, and an information display system provided with the same.

(Third Embodiment)

Figure 24:
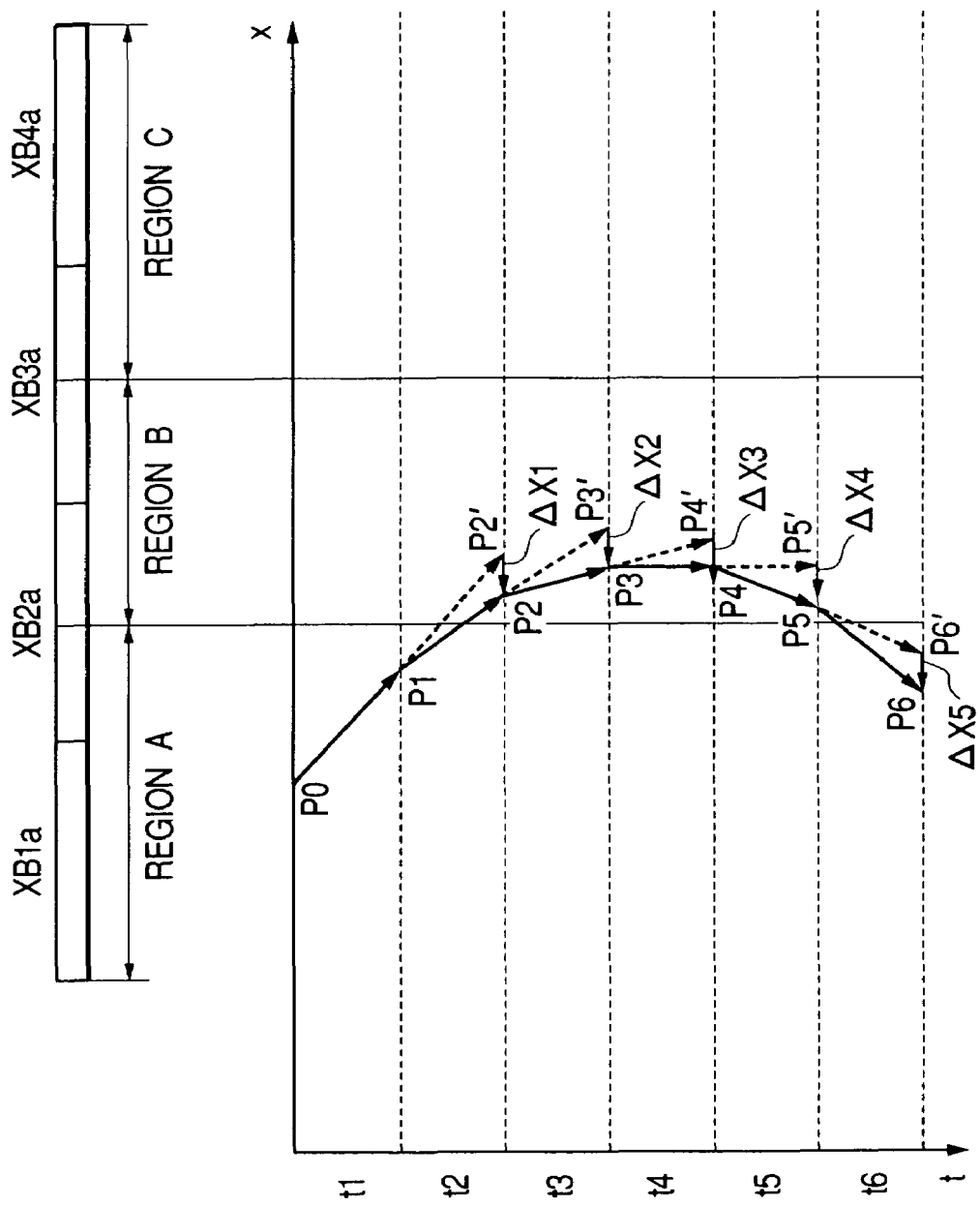
FIG. 24 is a schematic diagram showing an example of correction of a predicted coordinate.

FIG. 24 is a schematic diagram in which correction terms are used to further enhance the accuracy of prediction.

In this figure, a differential ΔX2 between P2 and P2' is calculated at P2. This value represents a differential between prediction and measurement, showing the degree of a change from the immediately previous point until the present detection.

When the predicted value P3' of P3 is calculated, this ΔX2 is used to correct P'3 with this value, whereby a value closer to an actual P3 than P'3 can be obtained.

In this way, a differential between the immediately previous predicted value and measured value is used to correct the present predicted value, thereby making it possible to predict a region more accurately.

A predicted coordinate is given by:

$$Pn'=(P(n-1)-P(n-2))*(tn/t(n-1))+P(n-1)+\Delta X(n-1) \quad (2)$$

Figure 25:
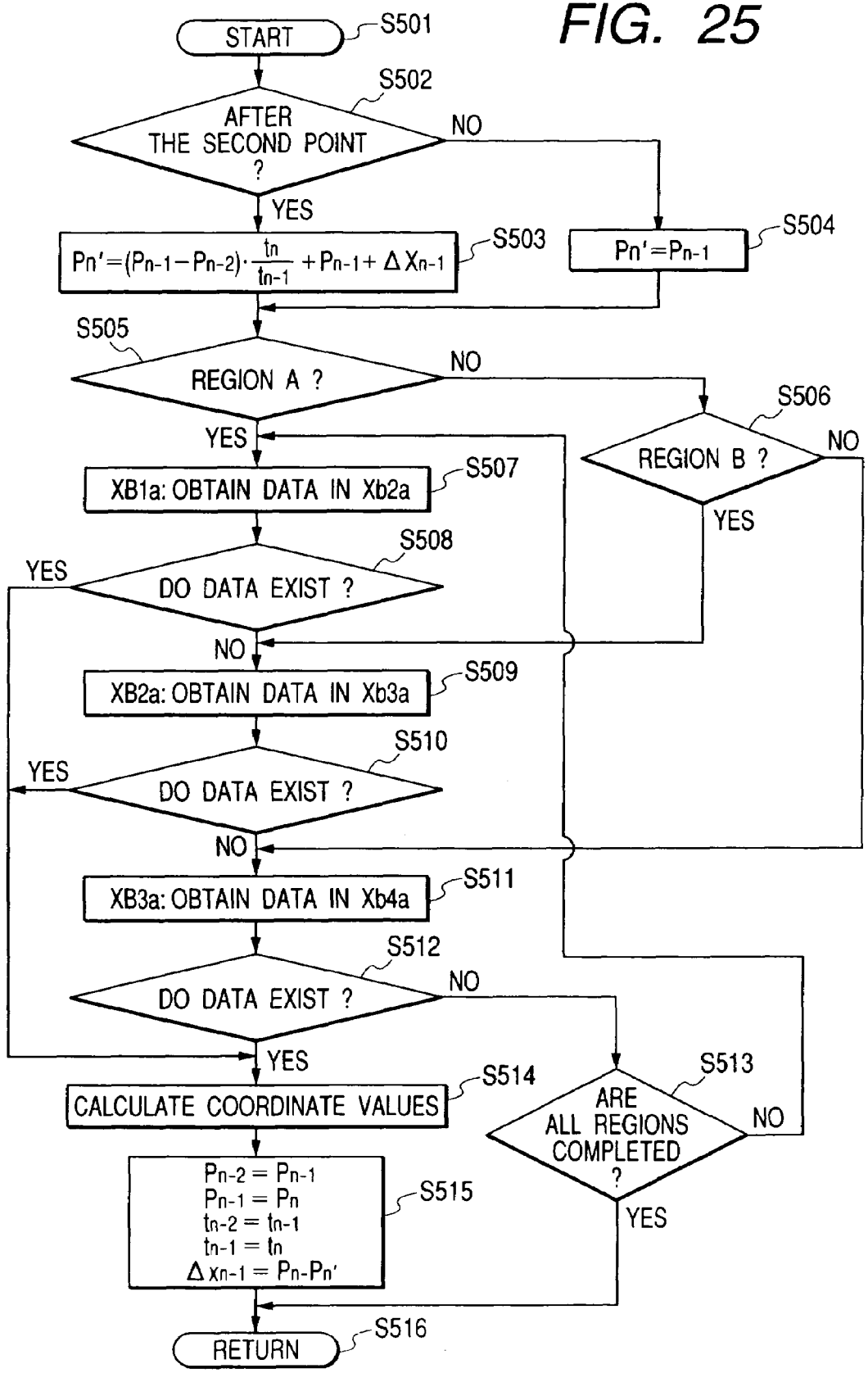
FIG. 25 is a flowchart of correction of a predicted coordinate.

FIG. 25 shows a flowchart thereof, and is different from FIG. 24 in that an equation for calculating the predicted coordinate in S503 is given by Equation (2).

Also, ΔX(n−1) is added to a variable to be stored in S515, and it is calculated by:

$$X(n-1)=Pn-Pn' \quad (3)$$

and is Stored.

Here, for the first point, data obtainment operations are performed with all block pairs. For the second detection, since the correction term cannot be calculated, 0 is used as a default value and calculation is carried out without correction.

Even in a configuration like this, a loss of time on the whole is very small.

According to this example, it is possible to provide a coordinate input apparatus and coordinate inputting method with high resolution and excellent agility in terms of usage without causing reduction in speed of detection of input light, and an information display system provided with the same.

Here, in the aforesaid embodiment, read is started with a predicted block in the first place, and when data cannot be obtained with that block, blocks are read out one after another, but the speed may be further enhanced by predicting the order of readout and reading blocks according to that order.

Figure 26:
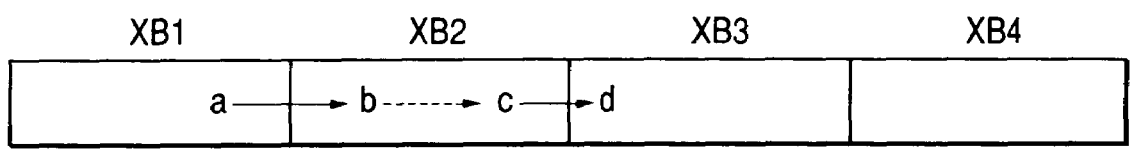
FIG. 26 is a view for illustrating determination of a predicted order.

FIG. 26 is a view for illustrating determination of a predicted order. The present input point predicted when the input point preceding by two times is a point a of XB1 and the immediately preceding point is a point b of XB2 is predicted to be a point c of XB2 according to its velocity and position. However, if the write speed is increased, it may be a point d of XB3. In that case, the order of read is ranked like XB2, XB3, XB4, XB1, and this is used as a read order table to perform read in accordance with this order, thereby making it possible to increase a possibility that data is obtained at an early stage.

For determination of order, for example, blocks may be ranked with the block nearest the predicted pixel being the first, or in accordance with the direction of travel.

Figure 27:
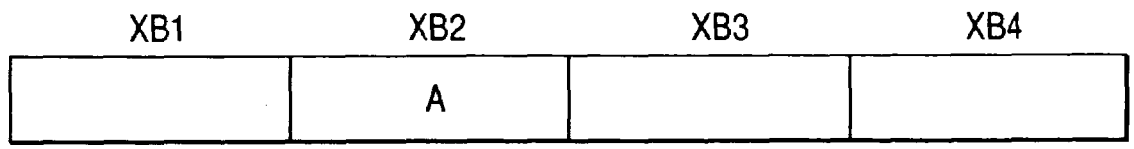
FIG. 27 is a view for illustrating determination of a predicted order.

Also, as shown in FIG. 27, when the immediately preceding input point and the input point preceding by two times are the same point A of XB2, there is a high possibility that they stop at that point, and thus determination of order is made so that readout is performed beginning with the same block, and then readout of neighboring blocks is performed. That is, it is also possible to make determination of order in terms of possibility with the highest being the first, rather than in accordance with displacement order like XB2, XB1, XB3, XB4.

Figure 28:
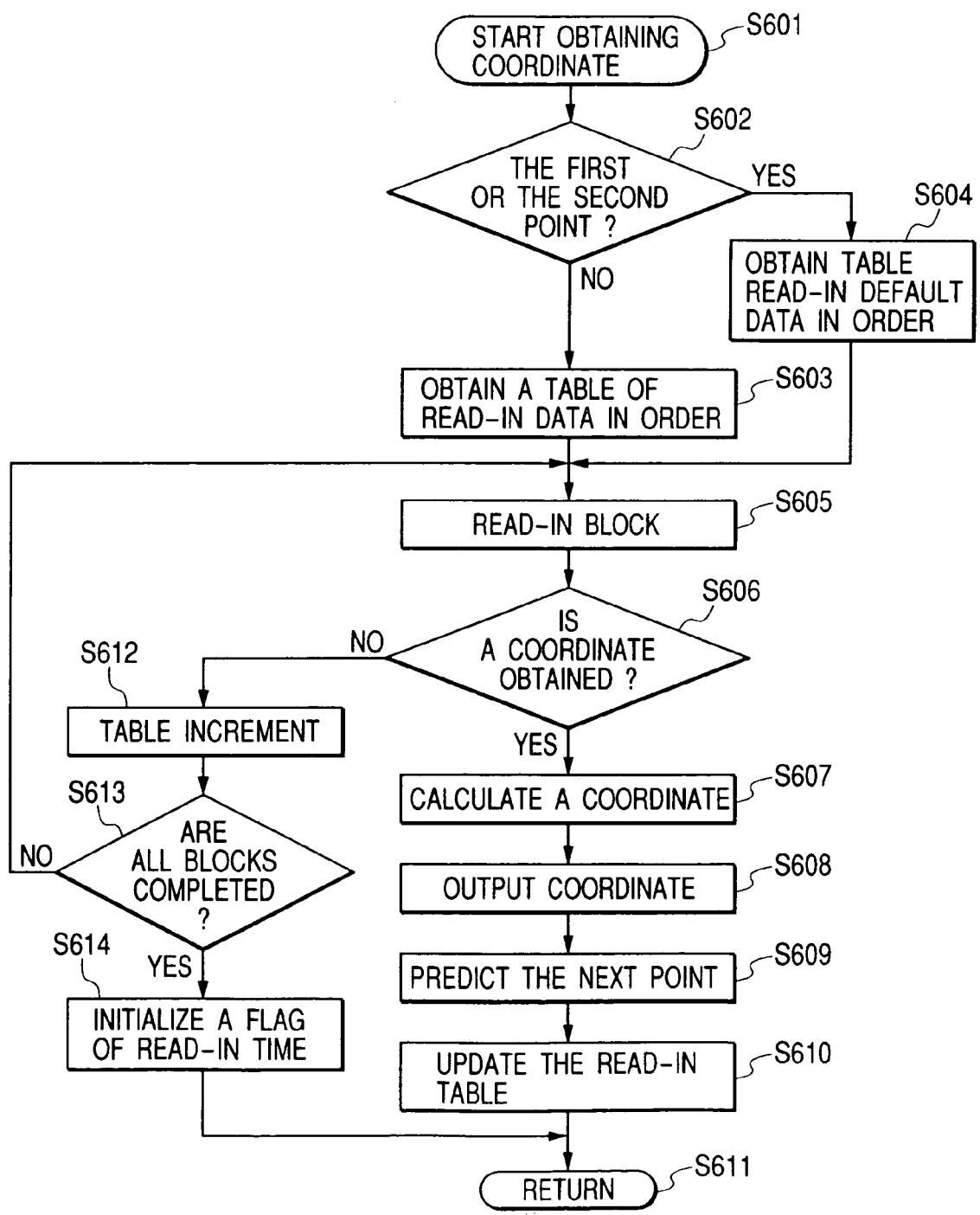
FIG. 28 is a flowchart of read operations according to order.

FIG. 28 is a flowchart of read operations according to order.

When a coordinate obtainment routine is started in S601, determination on whether it is a predictable point is made from the value of the flag of the number of reads, and if it is the first or the second, the read order table is read according to the default value (for example, placement order on the CCD) (S604). If it is not the first or the second, the read order table is read based on the predicted coordinate determined from the immediately preceding input point and the input point preceding by two times (S603).

Data is read from the block in compliance with this table (S605), determination is made on obtainment of the coordinate (S606), the coordinate is calculated if the coordinate is obtained (S607) and the coordinate value is outputted to a buffer or the like (S608), followed by determining a next predicted coordinate as in the case of the aforesaid embodiment (S609). The read order table is updated from this data for next read (S610), and one obtainment operation is ended.

If the block cannot be read at the time of reading the block, the table is incremented for reading a next block of the read table in S612, and it is repeated until the data is read (S613). If the data cannot be obtained even when all the blocks are read, it is determined that input has not been performed, and the flag of the number of reads for determining whether or not it is the first or second (S602) is cleared.

In this way, the read-start block and order for following blocks are determined, and readout is performed according to the order, thereby enabling high-speed reading to be performed.

Also, an embodiment implemented by supplying a program code of software for achieving the function of the each aforesaid embodiment to a computer of an apparatus or system connected to various kinds of devices, and operating the above described various kinds of devices in accordance with the program stored in the computer (CPU or MPU) of the system or apparatus so that the above described various kinds of devices are operated to achieve the function of the aforesaid embodiment is also included in the category of the present invention.

Also, in this case, the above described program code of software itself achieves the function of the aforesaid each embodiment, and the program code itself and means for supplying the program code to the computer, for example a storage medium storing the program code constitute the present invention. For the storage medium storing the program code, for example a floppy disk, a hard disk, an optical disk, an optical magnetic disk, a CD-ROM, a magnetic tape, a nonvolatile memory card, a ROM and the like can be used.

Also, needless to say, the program code is included in the each embodiment of the present invention not only when the computer executes the program code supplied thereto, whereby the function of the aforesaid each embodiment is achieved, but also when the program code works in association with the OS (operating system) operating in the computer, other application software or the like to achieve the function of the aforesaid each embodiment.

Furthermore, the case where after the supplied program code is stored in the memory comprised in a feature expansion board of the computer and a feature expansion unit connected to the computer, the CPU comprised in the feature expansion board and the feature expansion unit performs all or part of practical processing based on the instruction of the program, and the function of the aforesaid each embodiment is achieved through the processing is also included in the present invention.

As described above, according to the present invention, it is possible to provide a coordinate input apparatus and coordinate inputting method with high resolution and excellent agility in terms of usage without causing reduction in speed of detection of input light, and an information display system provided with the same.

What is claimed is:

1. A coordinate input apparatus for calculating a coordinate corresponding to a position of a light spot with which an input screen is irradiated, comprising:

a sensor array configured in such a manner that a plurality of optical/electrical conversion elements is arranged;

coordinate computing means for successively calculating coordinate data of the light spot from the output of the sensor array; and determining means for determining a readout-start portion of the sensor array from the coordinate data whose ordinal number precedes a predetermined ordinal number, at the time of calculating the coordinate data of the predetermined ordinal number, wherein the coordinate computing means calculates the coordinate data of the ordinal number based on the output from the readout-start portion determined by the determining means, and wherein the determining means further predicts order of readout of the sensor array predicted from the coordinate data whose ordinal number precedes the predetermined ordinal number, and if there is no output from the readout-start portion determined by the determining means, readout is performed in accordance with the order.

2. A coordinate inputting method of applying irradiation light to a predetermined position on an image input screen by operation of a designation device to generate a light spot, and obtaining coordinate data of the light spot by optical/electrical conversion of a sensor array, comprising steps of:

determining a readout-start portion of the sensor array from the coordinate data whose ordinal number equals a number immediately before a predetermined ordinal number, at the time of calculating coordinate data of the predetermined ordinal number; and obtaining an output partially from a predetermined number of optical/electrical conversion elements corresponding to the readout portion determined in the sensor array, calculating the coordinate data of the predetermined ordinal number, and generating a coordinate output signal corresponding to a predetermined position of the coordinate input screen, wherein in the determination, order of readout of the sensor array predicted from the coordinate data whose ordinal number precedes the predetermined ordinal number is further predicted, and if there is no output from the readout-start portion determined by the determining means, readout is performed in accordance with the order.

* * * * *

UNITED STATES PATENT AND TRADEMARK OFFICE
CERTIFICATE OF CORRECTION

| | | |
|---|---|---|
| PATENT NO. | : 6,965,378 B2 | |
| APPLICATION NO. | : 09/824748 | |
| DATED | : November 15, 2005 | |
| INVENTOR(S) | : Atsushi Tanaka | |

It is certified that error appears in the above-identified patent and that said Letters Patent is hereby corrected as shown below:

COLUMN 1:
Line 23, "Change" should read -- Charge --.

COLUMN 2:
Line 67, "and" should be deleted.

COLUMN 3:
Line 2, "coordinate." should read -- coordinate; --;
Line 4, "order." should read -- order; --; and
Line 6, "order." should read -- order, and --.

COLUMN 4:
Line 8, "do so" should read -- done so --;
Line 63, "modulation" should read -- modulating --; and
Line 66, "sate" should read -- state --.

COLUMN 5:
Line 2, "sate" should read -- state --;
Line 20, "are illustrated" should read -- is illustrated --; and
Line 65, "so-called a" should read -- a so-called --.

COLUMN 7:
Line 14, "for simplify" should read -- to simplify --.

COLUMN 8:
Line 39, "performed" should read -- be performed --.

COLUMN 10:
Line 58, "a" should be deleted.

COLUMN 11:
Line 35, "y coordinate." should read -- Y coordinate. --.

COLUMN 13:
Line 42, "Obtained," should read -- obtained, -- and "Predicted Coordinate" should read -- predicted coordinate --; and
Line 43, "Point" should read -- point -- and "calculated." should read -- calculated. --.

UNITED STATES PATENT AND TRADEMARK OFFICE
CERTIFICATE OF CORRECTION

PATENT NO. : 6,965,378 B2
APPLICATION NO. : 09/824748
DATED : November 15, 2005
INVENTOR(S) : Atsushi Tanaka It is certified that error appears in the above-identified patent and that said Letters Patent is hereby corrected as shown below:

COLUMN 14:
Line 37, "$X(n\text{-}1)$" should read -- $\Delta X(n\text{-}1)$ --; and
Line 39, "Stored." should read -- stored. --.

Signed and Sealed this

Fourteenth Day of November, 2006

JON W. DUDAS
*Director of the United States Patent and Trademark Office*